(12) United States Patent
Wagatsuma

(10) Patent No.: US 10,496,161 B2
(45) Date of Patent: Dec. 3, 2019

(54) INFORMATION PROCESSING SYSTEM, ELECTRONIC APPARATUS, INFORMATION PROCESSING APPARATUS, INFORMATION PROCESSING METHOD, ELECTRONIC APPARATUS PROCESSING METHOD AND NON-TRANSITORY COMPUTER READABLE MEDIUM

(71) Applicant: KONICA MINOLTA, INC., Chiyoda-ku, Tokyo (JP)

(72) Inventor: Yoshifumi Wagatsuma, Kunitachi (JP)

(73) Assignee: KONICA MINOLTA, INC., Tokyo (JP)

(*) Notice: Subject to any disclaimer, the term of this patent is extended or adjusted under 35 U.S.C. 154(b) by 27 days.

(21) Appl. No.: 15/643,998

(22) Filed: Jul. 7, 2017

(65) Prior Publication Data

US 2018/0018019 A1  Jan. 18, 2018

(30) Foreign Application Priority Data

Jul. 15, 2016 (JP) .................... 2016-139891

(51) Int. Cl.
| | |
|---|---|
| *H04M 3/56* | (2006.01) |
| *G06F 3/16* | (2006.01) |
| *G06F 3/0484* | (2013.01) |
| *G06F 1/16* | (2006.01) |
| *G06F 3/01* | (2006.01) |

(52) U.S. Cl.
CPC .............. *G06F 3/013* (2013.01); *G06F 1/163* (2013.01); *G06F 1/1694* (2013.01); *G06F 3/011* (2013.01); *G06F 3/012* (2013.01); *G06F 3/04842* (2013.01); *G06F 3/167* (2013.01); *H04M 3/567* (2013.01); *G06F 3/16* (2013.01); *G06F 2200/1637* (2013.01)

(58) Field of Classification Search
CPC . G06F 3/011; G06F 3/013; G06F 3/16; G06F 3/167; G06F 2200/1637; H04M 3/56; H04M 3/563; H04M 3/567
See application file for complete search history.

(56) References Cited

U.S. PATENT DOCUMENTS

| | | | | |
|---|---|---|---|---|
| 5,491,743 | A * | 2/1996 | Shiio | H04L 12/1822 348/14.01 |
| 7,457,784 | B2 * | 11/2008 | Hashimoto | G06Q 10/10 705/500 |
| 9,313,361 | B2 * | 4/2016 | Nakata | G06F 3/1206 |
| 9,386,279 | B2 * | 7/2016 | Sumiyoshi | H04N 7/155 |

(Continued)

FOREIGN PATENT DOCUMENTS

| | | | |
|---|---|---|---|
| EP | 3255871 A1 * | 12/2017 | ........... G11B 27/031 |
| JP | 2014128008 A | 7/2014 | |

*Primary Examiner* — James R Sheleheda
(74) *Attorney, Agent, or Firm* — Holtz, Holtz & Volek PC

(57) ABSTRACT

An electronic apparatus includes a terminal side association processing unit which associates first additional information with sound information, an imaging unit which images second additional information, and a detection unit which detects positional information and azimuth information of the imaging unit. The main body side association processing unit associates the associates the third additional information with the first additional information and the sound information based on an imaging time when the second additional information is imaged.

20 Claims, 18 Drawing Sheets

(56) References Cited

U.S. PATENT DOCUMENTS

| | | | |
|---|---|---|---|
| 2004/0189813 A1* | 9/2004 | Tanaka | G06F 17/30265 348/207.99 |
| 2004/0249620 A1* | 12/2004 | Chandra | G16B 5/00 703/11 |
| 2005/0068571 A1* | 3/2005 | Hart | H04N 1/00281 358/1.15 |
| 2005/0206733 A1* | 9/2005 | Miyamoto | H04N 1/32128 348/207.1 |
| 2006/0010366 A1* | 1/2006 | Hashimoto | G06F 16/437 715/202 |
| 2008/0098295 A1* | 4/2008 | Nelson | H04L 29/06027 715/233 |
| 2009/0119604 A1* | 5/2009 | Simard | G06Q 10/10 715/757 |
| 2009/0122157 A1* | 5/2009 | Kuboyama | G10L 25/78 348/231.4 |
| 2010/0023851 A1* | 1/2010 | Schormann | G06Q 10/10 715/232 |
| 2011/0113011 A1* | 5/2011 | Prorock | G11B 27/36 707/634 |
| 2011/0249954 A1* | 10/2011 | Meek | H04N 5/772 386/239 |
| 2013/0054636 A1* | 2/2013 | Tang | G06F 17/30722 707/769 |
| 2013/0307842 A1* | 11/2013 | Grinberg | G06F 3/1431 345/419 |
| 2015/0172335 A1* | 6/2015 | Sitrick | G06Q 10/101 715/719 |
| 2016/0112476 A1* | 4/2016 | Gudipaty | G06Q 10/10 715/753 |
| 2016/0119388 A1* | 4/2016 | Sitrick | H04L 65/403 715/753 |
| 2016/0283456 A1* | 9/2016 | Sitrick | G06F 3/04845 |
| 2016/0285929 A1* | 9/2016 | Oganezov | H04L 65/403 |
| 2017/0331951 A1* | 11/2017 | Cohen | G10L 17/00 |
| 2017/0372449 A1* | 12/2017 | Yarvis | H04N 5/2624 |
| 2018/0018019 A1* | 1/2018 | Wagatsuma | G06F 1/163 |
| 2018/0052837 A1* | 2/2018 | Kunieda | G06F 16/438 |

\* cited by examiner

Fig. 23
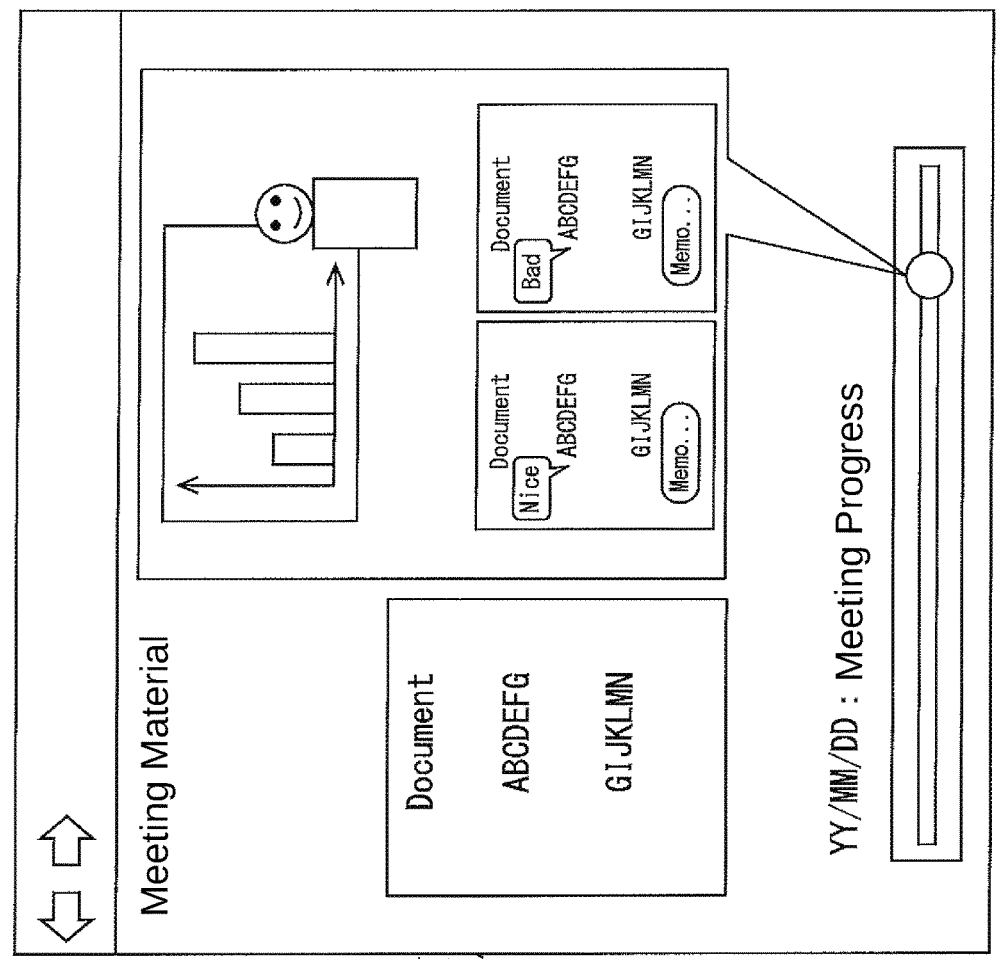
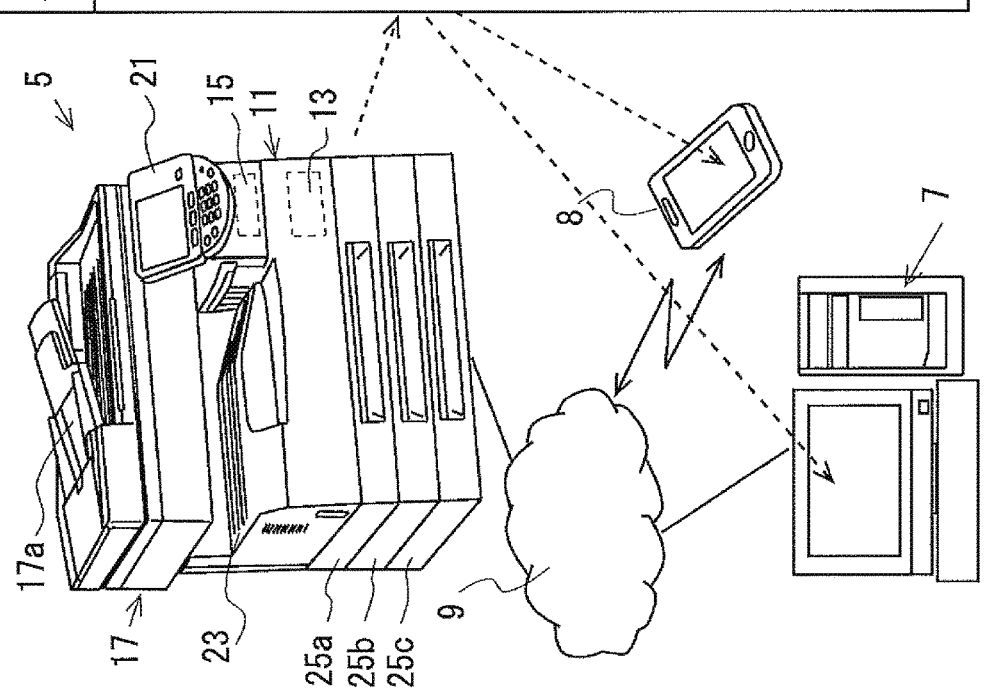

INFORMATION PROCESSING SYSTEM, ELECTRONIC APPARATUS, INFORMATION PROCESSING APPARATUS, INFORMATION PROCESSING METHOD, ELECTRONIC APPARATUS PROCESSING METHOD AND NON-TRANSITORY COMPUTER READABLE MEDIUM

Japanese Patent Application No. 2016-139891 filed on Jul. 15, 2016 including description, claims, drawings, and abstract the entire disclosure is incorporated herein by reference in its entirety.

BACKGROUND

Technological Field

The present invention relates to an information processing system, an electronic apparatus, an information processing apparatus, an information processing method, an electronic apparatus processing method and a non-transitory computer readable medium.

Description of the Related Art

Conventionally, during a meeting, participants add and correct a meeting material on which text and the like are printed. Because of this, the material to be recorded is a result containing added and corrected matters. However, information to be collected does not include information as to with which timing these revisions were made. Accordingly, since there is no information for remembering what is aimed at by additional matters such as added and corrected matters, the meanings of such additional matters may not be confirmed.

Also, if there is further information which is used during a meeting in addition to the above meeting material, such information may be saved by taking an image. However, such an image is not necessarily taken with the timing corresponding to the progress of the meeting. Accordingly, the information addition is less associated with the taken image. For example, when information written on a white board is imaged, the imaged information is only the final image of the white board in many cases. Accordingly, the timing of imaging is not in agreement with the progress of the meeting.

Incidentally, it has been proposed to take an image of viewers at the timing when the viewers concentrate glances on a television during watching the television (for example, refer to Japanese Patent Published Application No. 2014-128008).

However, in the case of the prior art technique described in Japanese Patent Published Application No. 2014-128008, viewers are simply imaged at the timing when the viewers concentrate glances on a television. Accordingly, even if the prior art technique is applied to the above meeting case on the assumption that the timing when viewers concentrate glances on a television is recognized to be equivalent to the timing when the participants of a meeting concentrate glances on information added to a white board during the meeting, it does not mean that the meaning of the information added to the white board is associated. In other words, it is not possible to confirm the meaning of information which is used in addition to the meeting material.

The present invention is made in order to solve such a prior art problem and it is an object of the present invention to provide an information processing system, an electronic apparatus, an information processing apparatus, an information processing method, an electronic apparatus processing method and a non-transitory computer readable medium wherein it is possible to confirm the meaning of information which is used in addition to a meeting material.

SUMMARY

To achieve at least one of the above-mentioned objects, according to an aspect of the present invention, an information processing system comprises a plurality of electronic apparatuses and an information processing apparatus which transmits and receives various information to and from the plurality of electronic apparatuses, wherein each of the plurality of electronic apparatuses comprises: a terminal side association processing unit which associates first additional information added to a material used during a meeting with sound information acquired at the timing when the first additional information is added to the material; an imaging unit which takes an image of second additional information which is used during the meeting in addition to the material; and a detection unit which detects positional information and azimuth information of the imaging unit, wherein the information processing apparatus comprises: an acquisition unit which acquires second additional information imaged by the imaging unit from each of the plurality of electronic apparatuses when the detection unit detects the positional information and azimuth information of the imaging unit; a selection unit which selects third additional information to be associated from among the second additional information acquired by the acquisition unit; and a main body side association processing unit which associates the third additional information selected by the selection unit with the first additional information and the sound information which are associated with each other by the terminal side association processing unit, and wherein the main body side association processing unit associates the third additional information with the first additional information and the sound information based on an imaging time when the second additional information is imaged.

Also, in accordance with the image processing system of the present invention, it is preferred that the information processing apparatus further comprises a main body side communication control unit which controls transmission and reception of the various information, wherein the main body side communication control unit requests the second additional information from each of the plurality of electronic apparatuses in accordance with whether or not a threshold value is equal to or exceeded by the rate at which virtual sight lines connecting a virtual imaging object with the imaging unit along a virtual imaging direction generated with reference to the positional information and azimuth information concentrate on the setting area.

Furthermore, in accordance with the image processing system of the present invention, it is preferred that when a predetermined time elapses after the rate decreases below the threshold value, the main body side communication control unit requests the second additional information from each of the plurality of electronic apparatuses.

Still further, in accordance with the image processing system of the present invention, it is preferred that when the rate increases up to or higher than the threshold value before the predetermined time elapses, the predetermined time is reset.

Still further, in accordance with the image processing system of the present invention, it is preferred that each of the plurality of electronic apparatuses further comprises a terminal side communication control unit which controls transmission and reception of the various information, wherein when the meeting has been finished while the rate is lower than the threshold value, the terminal side communication control unit transmits the second additional information to the information processing apparatus.

Still further, in accordance with the image processing system of the present invention, it is preferred that the information processing apparatus further comprises: an image control unit which generates selected image information containing the third additional information selected by the selection unit; a display unit which displays the selected image information generated by the image control unit; and a sound output unit which outputs sounds based on the imaging time and the sound information, wherein the selection unit selects the third additional information, which is effective, from among the second additional information based on the order of priorities.

Still further, in accordance with the image processing system of the present invention, it is preferred that the information processing apparatus further comprises: a determination unit which determines the order of priorities based on the sight line, the distortion of an imaging object imaged by the imaging unit contained in the second additional information, the distance between the imaging unit and the virtual imaging object or presence of an obstacle between the imaging unit and the virtual imaging object.

Still further, in accordance with the image processing system of the present invention, it is preferred that as the angle that the virtual sight line makes with the virtual imaging object approaches a right angle, the determination unit raises the priority as a selected image information candidate.

Still further, in accordance with the image processing system of the present invention, it is preferred that each of the plurality of electronic apparatuses further comprises an image determination unit which determines whether or not a predetermined value is exceeded by the similarity degree of the image information taken by the imaging unit, wherein if the image determination unit determines that the predetermined value is exceeded by the similarity degree of the taken image information, the terminal side communication control unit transmits the taken image information to the information processing apparatus as the second additional information.

Still further, in accordance with the image processing system of the present invention, it is preferred that the information processing apparatus further comprises a main body side storage unit which stores master information corresponding to the material, wherein if it is determined that the taken image information corresponds to a person's face or the material generated from the master information stored in the main body side storage unit, the terminal side communication control unit discards the taken image information.

Still further, in accordance with the image processing system of the present invention, it is preferred that each of the plurality of electronic apparatuses further comprises an inhibition determination unit which determines, based on inhibition conditions, whether or not the second additional information or the sound information cannot be acquired, wherein if the inhibition determination unit determines that the second additional information or the sound information cannot be acquired, the terminal side communication control unit neglects the request for the second additional information from the main body side communication control unit.

Still further, in accordance with the image processing system of the present invention, it is preferred that each of the plurality of electronic apparatuses further comprises: an arithmetic unit which calculates the rate; and a terminal side storage unit which stores the threshold value, wherein if the arithmetic unit calculates the rate before the main body side communication control unit requests the second additional information, the terminal side communication control unit transmits the second additional information to the information processing apparatus in accordance with whether or not the rate is greater than or equal to the threshold value.

Still further, in accordance with the image processing system of the present invention, it is preferred that the threshold value can be adjusted by the plurality of electronic apparatuses or the information processing apparatus.

Still further, in accordance with the image processing system of the present invention, it is preferred that the image control unit controls output of an interface image which associates the master information stored in the main body side storage unit, the sound information, the first additional information and the selected image information with each other.

Still further, in accordance with the image processing system of the present invention, it is preferred that in the case where each of the plurality of electronic apparatuses transmits the second additional information to the information processing apparatus on a real time base, a real time image displaying the second additional information is updated besides the interface image each time the second additional information is transmitted by the terminal side communication control unit.

Still further, in accordance with the image processing system of the present invention, it is preferred that each of the plurality of electronic apparatuses further comprises an extracting unit extracts, at each detection cycle and based on medium information of a paper medium imaged by the imaging unit, a difference between meeting content contained in the medium information and the meeting content contained in the master information saved in the information processing apparatus, wherein at the timing when detecting the difference which is extracted by the extracting unit, the terminal side association processing unit associates the difference information of the difference with the sound information.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

FIG. 23 is a schematic diagram for showing an example of a GUI in which the master information, difference information, sound information and further information to be added besides the difference information are associated with each other in accordance with the embodiment of the present invention.

DETAILED DESCRIPTION OF EMBODIMENTS

Hereinafter, one or more embodiments of the present invention will be described with reference to the drawings. However, the scope of the invention is not limited to the disclosed embodiments.

In what follows, an embodiment of the present invention will be explained with reference to drawings. However, the present invention is not limited to the following specific embodiment.

Figure 1:
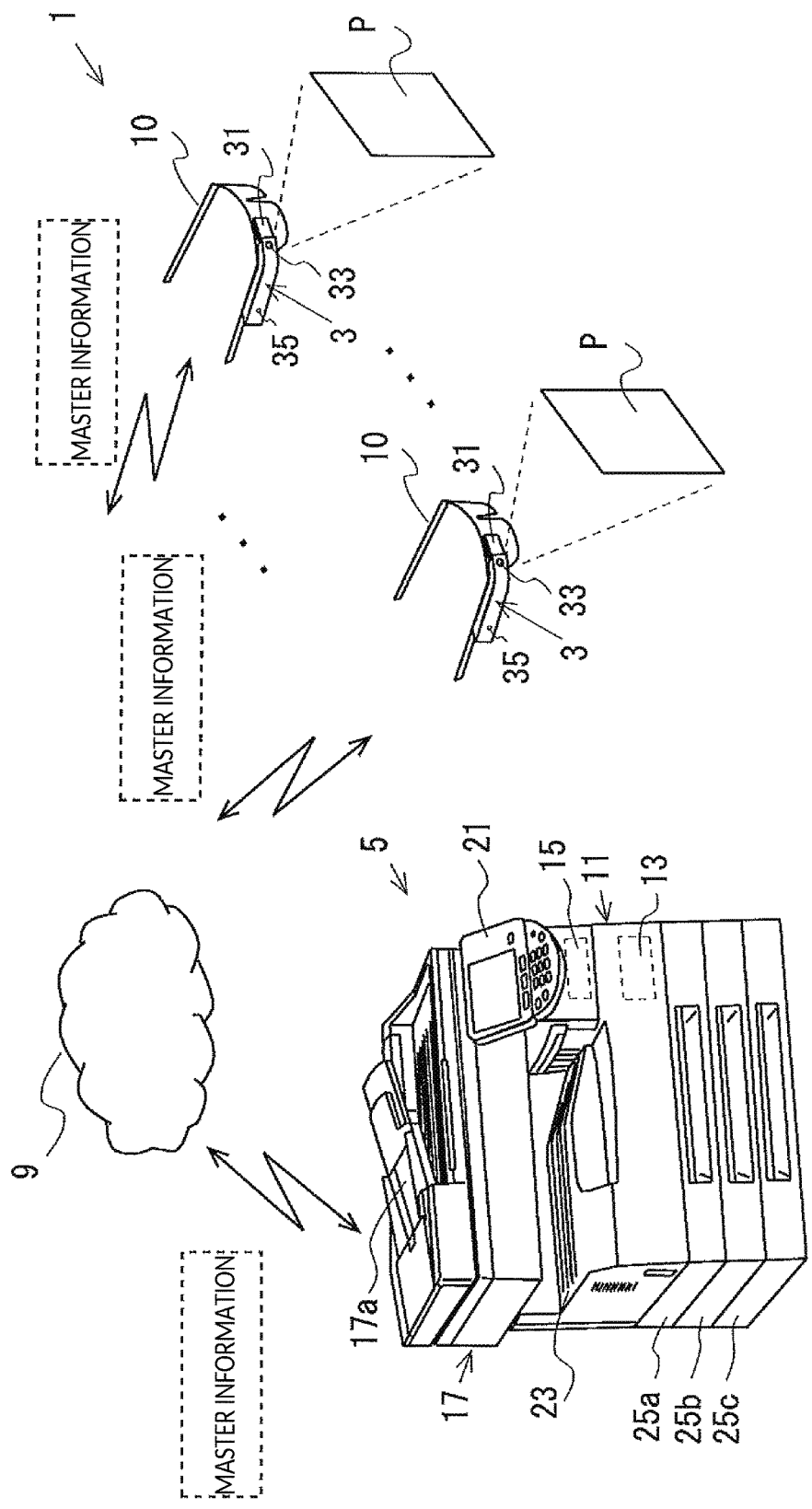
FIG. 1 is a schematic diagram for showing the overall configuration of an information processing system 1 in accordance with an embodiment of the present invention.

FIG. 1 is a schematic diagram for showing the overall configuration of an information processing system 1 in accordance with an embodiment of the present invention. As illustrated in FIG. 1, the information processing system 1 consists of a plurality of electronic apparatuses 3 and an information processing apparatus 5 which are connected through a network 9. The plurality of electronic apparatuses 3 and the information processing apparatus 5 can exchange various information through the network 9. The electronic apparatus 3 is attached to a pair of eyeglasses 10 (referred to herein for simplicity also as eyeglasses) to make it possible to use the eyeglasses 10 as smart eyeglasses. Although described below in detail, the information processing apparatus 5 is not only used as an MFP (Multi-Functional Peripheral) but also capable of exchanging master information as an item of the various information with the electronic apparatus 3 through the network 9.

Also, although described below in detail, the information processing system 1 is configured such that the electronic apparatus 3 and the information processing apparatus 5 are cooperated to make it possible to confirm, from speech content during a meeting, the meaning of additional matters added in handwritten or the like to a paper medium P which is used as a meeting material during the meeting.

The electronic apparatus 3 is provided with a display unit 31, an imaging unit 33, a sound recording unit 35 and so forth. The display unit 31 displays various images to a user through the eyeglasses 10. Namely, the display unit 31 displays various information acquired through the network 9 in the form of images. The imaging unit 33 consists, for example, of an image sensor such as a CCD or a CMOS to acquire a still image or a motion picture by imaging a subject. The sound recording unit 35 records surrounding sounds. The electronic apparatus 3 can acquire an image formed on a paper medium P, perform various processes with the acquired image, and transmit the execution results of the various processes to the information processing apparatus 5. Incidentally, the display unit 31 may display an image in a position apart from the eyeglasses 10 with a prism or the like. Also, the electronic apparatus 3 is provided with operation buttons and the like which are not shown in the figure.

The information processing apparatus 5 is provided with a printer unit 11, a power supply unit 13, a control unit 15, an image reading unit 17, an operation display unit 21, a catch tray 23, a paper feed cassettes 25a to 25c and the like. The printer unit 11, the power supply unit 13 and the control unit 15 is installed inside of a housing of the information processing apparatus 5.

Each of the paper feed cassettes 25a to 25c is arranged such that it can be withdrawn from the housing of the information processing apparatus 5. The paper feed cassette 25a, the paper feed cassette 25b and the paper feed cassette 25c are collectively referred to simply as the paper feed cassette 25 when they need not be distinguished. The paper feed cassette 25a, the paper feed cassette 25b and the paper feed cassette 25c may accommodate paper mediums P having different sizes respectively. The paper medium P accommodated in the paper feed cassette 25 is transmitted to the printer unit 11 one by one when printing. Incidentally, while there are three paper feed cassettes 25 in the above example, the present invention is not limited thereto.

In the housing of the information processing apparatus 5, the catch tray 23 is located above a portion in which the printer unit 11 is installed and below a portion in which the image reading unit 17 is installed. A paper medium P on which an image is formed by the printer unit 11 is discharged to the catch tray 23 from the inside of the housing.

The operation display unit 21 is located in an upper position of the information processing apparatus 5, and arranged in a front side where the paper feed cassette 25 can be withdrawn from the housing. The operation display unit 21 accepts an operation of a user, and is capable of displaying at least one of the result of the operation accepted of the user and the internal state of the information processing apparatus 5.

Although described below in detail, the printer unit 11 makes use of an electrophotographic process technique to form an image on a paper medium P accommodated in the paper feed cassette 25 or a manual insertion tray which is not shown in the figure. The printer unit 11 is capable of combining four colors or five colors including a particular color by a tandem system to form a color image on a paper medium P.

The image reading unit 17 is located at the top of the information processing apparatus 5. The image reading unit 17 is provided with an automatic document feeder 17a. The image reading unit 17 successively receives originals placed on an original tray and transmitted by the automatic document feeder 17a, and reads the image of the original as analog image data.

Figure 2:
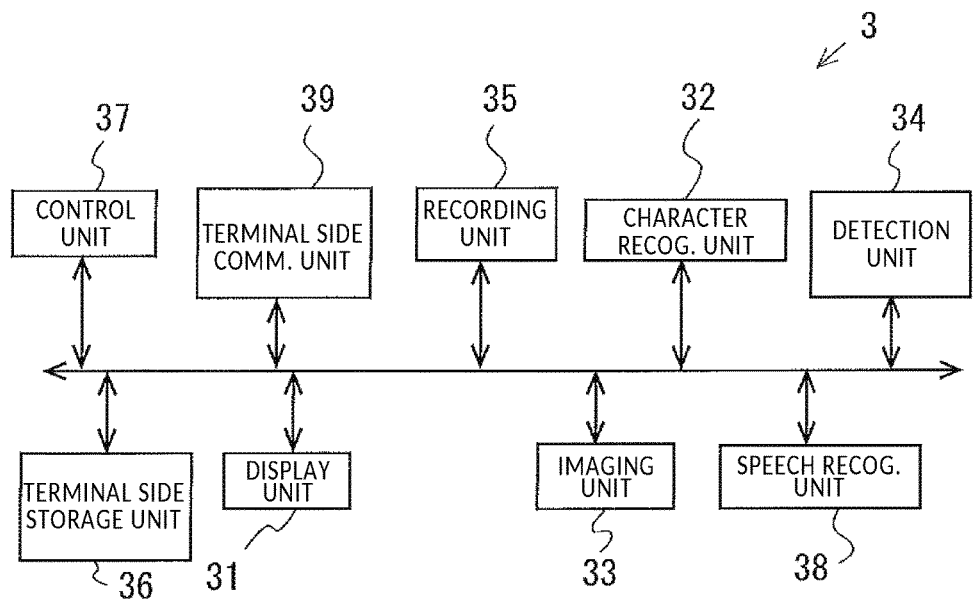
FIG. 2 is a view for showing an example of the configuration of the electronic apparatus 3 in accordance with the embodiment of the present invention.

FIG. 2 is a view for showing an example of the configuration of the electronic apparatus 3 in accordance with the embodiment of the present invention. As shown in FIG. 2, the electronic apparatus 3 is provided with a character recognition unit 32, a detection unit 34, a terminal side storage unit 36, a control unit 37, a speech recognition unit 38, a terminal side communication unit 39 and the like in addition to the display unit 31, the imaging unit 33 and the sound recording unit 35 as described above. The terminal side communication unit 39 transmits and receives various signals.

The character recognition unit 32 recognizes characters. Specifically, the character recognition unit 32 can recognize characters, for example, by operating a character recognition function such as an optical character recognition function. The character recognition unit 32 identifies a character area based on image information of a paper medium P which is imaged by the imaging unit 33. The character recognition unit 32 then recognizes characters in the identified character area.

The detection unit 34 identifies positional information and azimuth information of the electronic apparatus 3, particularly of the imaging unit 33 by a GPS function. The terminal side storage unit 36 consists of a nonvolatile memory such as a flash memory. The terminal side storage unit 36 is used to store a program for taking images with the imaging unit 33, a program for recording sounds with the sound recording unit 35 and the like.

The terminal side storage unit 36 is used to store also various data in addition to the above programs. For example, the terminal side storage unit 36 stores image data of taken image information of a paper medium P which is imaged by the imaging unit 33. Furthermore, the terminal side storage unit 36 stores sound recording data of sound information of surrounding sounds which is recorded by the sound recording unit 35. Still further, the terminal side storage unit 36 stores various image data or document data acquired through the terminal side communication unit 39.

The speech recognition unit 38 recognizes voices. Namely, the speech recognition unit 38 can recognize voices, for example, by operating a speech recognition function. For example, the speech recognition unit 38 recognizes voices by analyzing electrical signals output from a piezoelectric device.

The control unit 37 consists of a CPU, a ROM, a RAM and an I/O interface which are not shown in the figure. The CPU of the control unit 37 reads various programs from the ROM or the terminal side storage unit 36 in accordance with required processes, loads the programs on the RAM, and executes the loaded programs which cooperate with the control unit 37 and control the operation of each element of the electronic apparatus 3.

Figure 3:
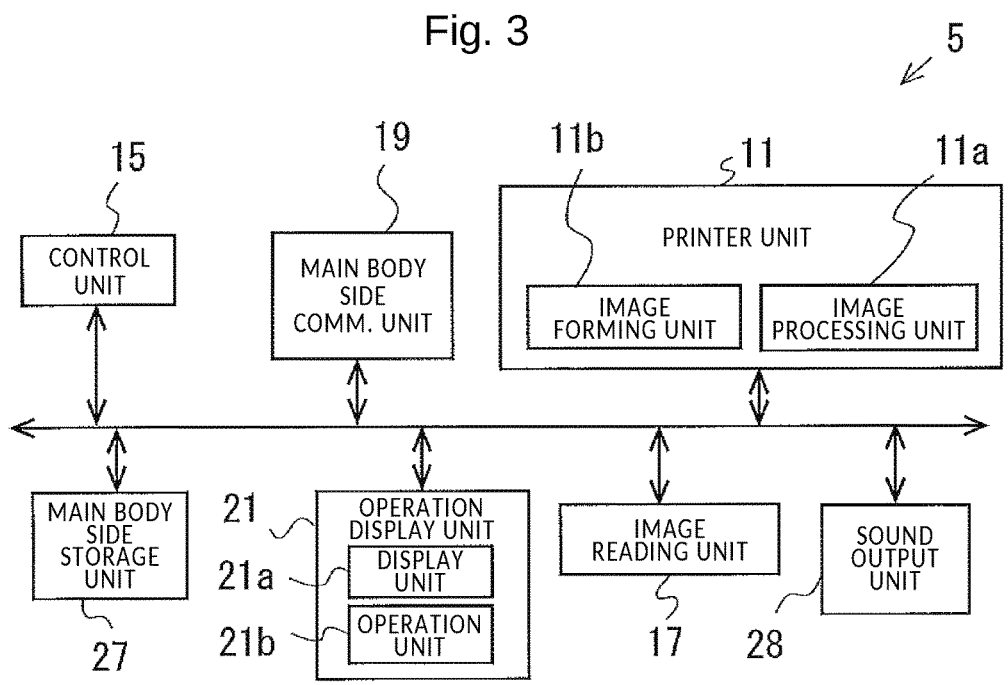
FIG. 3 is a view for showing an example of the configuration of an information processing apparatus 5 in accordance with the embodiment of the present invention.

FIG. 3 is a view for showing an example of the configuration of the information processing apparatus 5 in accordance with the embodiment of the present invention. As shown in FIG. 3, the information processing apparatus 5 is provided with a main body side storage unit 27, a main body side communication unit 19 and a sound output unit 28 in addition to the printer unit 11, the control unit 15, the image reading unit 17 and the operation display unit 21 as described above.

The printer unit 11 is provided with an image processing unit 11a and an image forming unit 11b. The image processing unit 11a is provided with an arithmetic unit such as a CPU or an integrated circuit such as an ASIC and capable of performing various processes.

For example, the image processing unit 11a performs various processes with analog image data read by an image sensor, which is not shown in the figure, of the image reading unit 17. Specifically, the analog image data is converted to digital image data consisting of RGB codes by performing an analog process, A/D conversion, shading compensation, an image compression process, a variable magnification process and so forth. The image processing unit 11a converts the digital image data consisting of RGB codes to image data corresponding to color Y (yellow), color M (Magenta), color C (cyan) and color K (black), and transmits conversion results to the image forming unit 11b.

The image forming unit 11b forms a color image based on the image data transmitted from the image processing unit 11a. The image forming unit 11b is provided with an image forming unit for each color, an intermediate transfer unit and a fixing unit. The image forming unit charges the peripheral surface of a photoreceptor drum with a charging unit, forms an electrostatic latent image by radiating light to the photoreceptor drum with a writing unit, and forms a toner image by visualizing the electrostatic latent image of the photoreceptor drum with a developing unit. The intermediate transfer unit transfers the toner image of the photoreceptor drum to an intermediate transfer belt successively for each color, and transfers the transferred toner image to a sheet. The fixing unit fixes the toner image transferred from the intermediate transfer unit.

The operation display unit 21 is provided with an operation unit 21b for accepting user operations, and a display unit 21a for displaying proposed operations to the user. The display unit 21a includes a touch panel laminated thereon and serves as a touch panel display. The sound output unit 28 outputs sounds based on an imaging time and sound information. The sound output unit 28 can output sounds in synchronization with indication content of the display unit 21a. Incidentally, the operation display unit 21 may be provided with a plurality of different color LEDs for the purpose of giving intuitive visual information to a user.

The main body side communication unit 19 accepts various jobs such as a print job transmitted to the information processing apparatus 5 through the network 9. When performing a function other than those performed by the control unit 15, the main body side communication unit 19 communicates with an external device. The main body side storage unit 27 consists of a nonvolatile storage device such as an HDD. The main body side storage unit 27 stores various image data or document data in addition to various control programs. The document data stored in the information processing apparatus 5 is used as master information.

If the document data is a meeting material, the master information is information containing meeting content. The master information is used when a printing image is formed on a paper medium P by the printer unit 11. The master information contains, for example, text information. The text information contains characters, a style for writing each character, a position in which each character is to be printed, and so forth. Accordingly, by acquiring the master information from the information processing apparatus 5, the electronic apparatus 3 can acquire print content of print images to be formed on a paper medium P used as a meeting material.

Incidentally, the master information which the electronic apparatus 3 acquires from the information processing apparatus 5 is not necessarily transferred from the information processing apparatus 5 to the electronic apparatus 3, but can be a copy of the master information. Also, when comparing meeting content contained in the master information with taken image information of a paper medium P which is imaged by the imaging unit 33 of the electronic apparatus 3, it is preferred that the master information is saved in the information processing apparatus 5.

Specifically, the control unit 15 consists mainly of a CPU, a ROM, a RAM and an I/O interface which are not shown in the figure. The CPU of the control unit 15 reads various programs from the ROM or the main body side storage unit 27 in accordance with required processes, loads the programs on the RAM, and executes the loaded programs which cooperate with the control unit 15 and control the operation of each element of the information processing apparatus 5.

Figure 4:
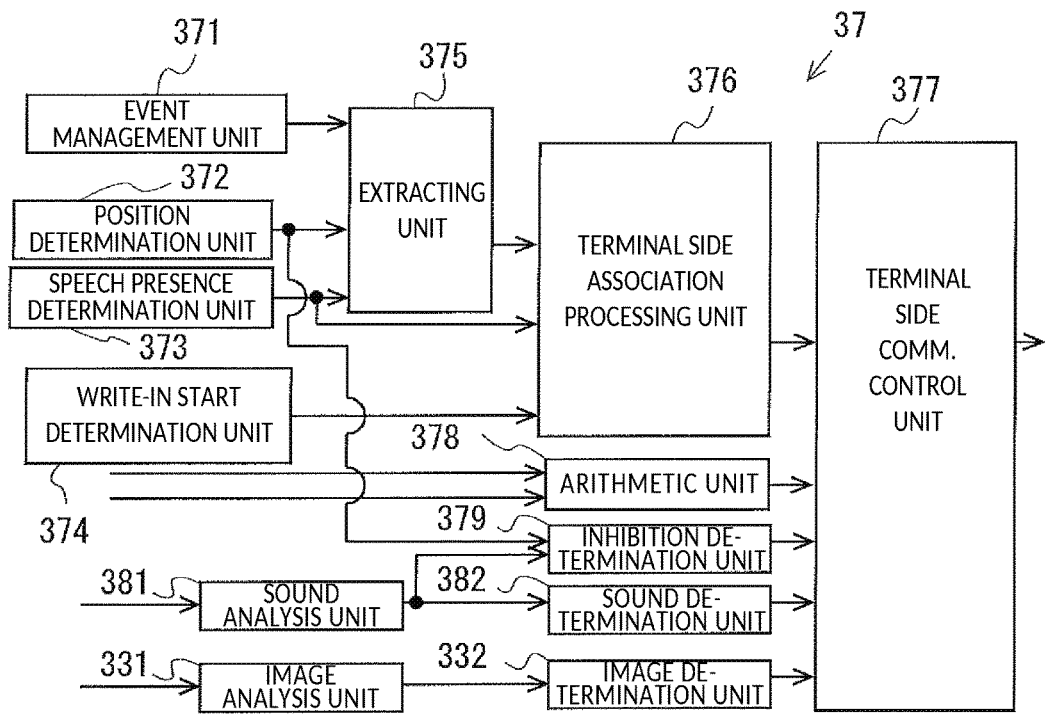
FIG. 4 is a view showing an example of a functional configuration of a control unit 37 of the electronic apparatus 3 in accordance with the embodiment of the present invention.

FIG. 4 is a view showing an example of a functional configuration of the control unit 37 of the electronic apparatus 3 in accordance with the embodiment of the present invention. The control unit 37 is responsible for controlling the operation of the electronic apparatus 3 and implemented with a microcomputer which consists mainly of the CPU, the ROM, the RAM, and the I/O interface which are not shown in the figure. A predetermined control program is run by the control unit 37 to implement various functions such as an event management unit 371, a position determination unit 372, a speech presence determination unit 373, a write-in start determination unit 374, an extracting unit 375, a terminal side association processing unit 376, a terminal side communication control unit 377, an arithmetic unit 378, an inhibition determination unit 379, a sound analysis unit 381, a sound determination unit 382, an image analysis unit 331, an image determination unit 332 and the like as illustrated in FIG. 4.

Figure 5:
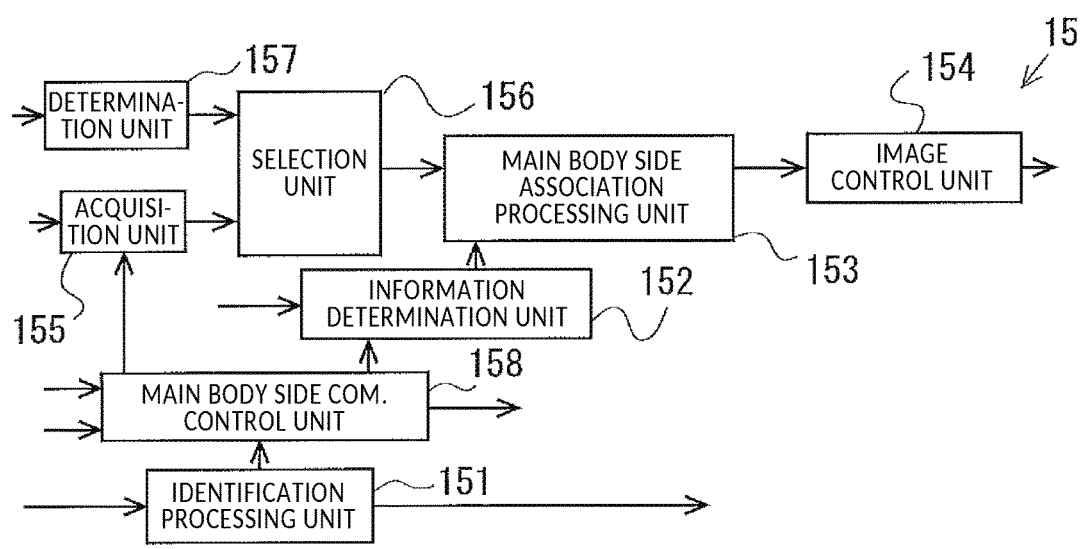
FIG. 5 is a view showing an example of a functional configuration of a control unit 15 of the information processing apparatus 5 in accordance with the embodiment of the present invention.

FIG. 5 is a view showing an example of a functional configuration of the control unit 15 of the information processing apparatus 5 in accordance with the embodiment of the present invention. The control unit 15 is responsible for controlling the operation of the information processing apparatus 5 and implemented with a microcomputer which consists mainly of the CPU, the ROM, the RAM, and the I/O interface which are not shown in the figure. A predetermined control program is run by the control unit 15 to implement various functions such as an identification processing unit 151, an information determination unit 152, a main body side association processing unit 153, an image control unit 154, an acquisition unit 155, a selection unit 156, a determination unit 157, a main body side communication control unit 158 and the like as illustrated in FIG. 5.

Next, the above various functions will specifically be explained. Based on the medium information of the paper medium P imaged by the imaging unit 33, the extracting unit 375 extracts, at each detection cycle, the differences between the meeting content contained in the medium information and the meeting content contained in the master information saved in the information processing apparatus 5. The sound recording unit 35 records surrounding sounds while a meeting is being held in relation to the meeting content contained in the master information.

At the timing when detecting the differences which are extracted by the extracting unit 375, the terminal side association processing unit 376 associates the difference information of the differences with the sound information of sounds recorded by the sound recording unit 35.

The paper medium P is a material to be used during a meeting and on which is written an additional material. Namely, the terminal side association processing unit 376 associates first additional information added to a material used during a meeting with sound information acquired at the timing when the first additional information is added to the material. Furthermore, if there is second additional information which is used during the meeting in addition to the distributed material, the imaging unit 33 takes an image of the second additional information.

The acquisition unit 155 acquires second additional information imaged by the imaging unit 33 from each of the plurality of electronic apparatuses 3 when the detection unit 34 detects the positional information and azimuth information of the imaging unit 33. The selection unit 156 selects third additional information to be associated from among the second additional information acquired by the acquisition unit 155. The main body side association processing unit 153 associates the third additional information selected by the selection unit 156 with the first additional information and the sound information which are associated with each other by the terminal side association processing unit 376. Namely, the main body side association processing unit 153 associates the third additional information with the first additional information and the sound information based on the imaging time when the second additional information is imaged.

Incidentally, the main body side association processing unit 153 associates the master information with pair information consisting of the difference information and the sound information which are associated with each other by the terminal side association processing unit 376. The master information is information to form the material. The main body side storage unit 27 stores the master information and the attribute information of the master information. The attribute information of the master information includes storage destination information of the master information, identification information for identifying the meeting content contained in the master information, host information about the host of the meeting relating to the meeting content contained in the master information, or output person information about the output person who commands formation of a print image on a paper medium P.

The identification processing unit 151 creates identification image information from the attribute information of the master information stored in the main body side storage unit 27. The identification image information is information about the meeting content contained in the master information, and contains the above storage destination information of the master information. Accordingly, if the storage destination information of the master information is identified by the identification image information, the electronic apparatus 3 can acquire the master information. Incidentally, for example the storage destination information of the master information includes the IP address of the information processing apparatus 5 and the path of the master information which are stored in the main body side storage unit 27.

The image processing unit 11*a* forms print images on a paper medium P based on meeting material image information created from the meeting content contained in the master information and identification image information created by the identification processing unit 151. The image processing unit 11*a* forms, as print images, a meeting material image based on the meeting material image information and an identification image X based on the identification image information.

The identification image information preferably contains date information about the date when a print image is formed on a paper medium P and other information such as an individual ID of a user who is operating the electronic apparatus 3, in addition to the storage destination information of the master information. If the user who is operating the electronic apparatus 3 is the same person as the above output person, preferably, the output person information is contained in the identification image information. The identification image X consists of a two-dimensional code which can be acquired by imaging it with the imaging unit 33. Accordingly, preferably, the imaging unit 33 has a sufficient resolution for reading the two-dimensional code. The two-dimensional code is, for example, a QR code (registered trademark).

The image control unit 154 controls output of an interface image. The interface image is used to freely output any one from any other of the master information, the attribute information of the master information, the difference information and the sound information. The interface image is used to freely output the sound information based on the difference information.

The image control unit 154 generates selected image information containing the third additional information selected by the selection unit 156. The display unit 21*a* displays an interface image containing the selected image information generated by the image control unit 154. The sound output unit 28 outputs sounds based on the sound information and the imaging time when the second additional information is imaged. The selection unit 156 selects effective third additional information from among the second additional information based on the order of priorities.

The order of priorities is determined by the determination unit 157 based on the sight line generated by a virtual imaging direction and the positional relation to a virtual imaging object, the distortion of the imaging object imaged by the imaging unit 33 contained in the second additional information, the distance between the imaging unit 33 and the virtual imaging object or presence of an obstacle between the imaging unit 33 and the virtual imaging object.

The interface image is used to associate the master information stored in the main body side storage unit 27, the sound information, the first additional information and the selected image information with each other.

The image control unit 154 controls output of a real time image in addition to the interface image. When each of the plurality of electronic apparatuses 3 transmits the second additional information to the information processing apparatus 5 on a real time base, the second additional information is updated and displayed each time the terminal side communication control unit 377 transmits the second additional information.

The main body side communication control unit 158 controls transmission and reception of various information. The virtual sight line is a line connecting between a virtual imaging object and the imaging unit 33 of any one of the plurality of electronic apparatuses 3 along a virtual imaging direction generated with reference to the positional information and azimuth information of the imaging unit 33 of the electronic apparatus 3. The main body side communication control unit 158 requests the second additional information from each of the plurality of electronic apparatuses 3 in accordance with whether or not the rate of the virtual sight lines concentrated on a setting area is greater than or equal to a threshold value. As the angle that the virtual sight line makes with the virtual imaging object approaches a right angle, the determination unit 157 raises the priority of the corresponding second additional information as a selected image information candidate. The threshold value can be adjusted by the plurality of electronic apparatuses 3 or the information processing apparatus 5.

When there occurs a change from increase to decrease in the rate at which virtual sight lines connecting a virtual imaging object with the imaging unit 33 along a virtual imaging direction generated with reference to the positional information and azimuth information concentrate on the setting area, the main body side communication control unit 158 requests the second additional information from each of the plurality of electronic apparatuses 3. Alternatively, when there occurs a change from increase to decrease in the rate at which virtual sight lines connecting a virtual imaging object with the imaging unit 33 along a virtual imaging direction generated with reference to the positional information and azimuth information concentrate on the setting area, and a predetermined time elapses thereafter, the main body side communication control unit 158 requests the second additional information from each of the plurality of electronic apparatuses 3.

Incidentally, before a predetermined time elapses after there occurs a change from increase to decrease in the rate at which virtual sight lines connecting a virtual imaging object with the imaging unit 33 along a virtual imaging direction generated with reference to the positional information and azimuth information concentrate on the setting area, if the rate starts increasing again, the predetermined time is reset.

The terminal side communication control unit 377 controls transmission and reception of various information. When a meeting is finished, the terminal side communication control unit 377 transmits the second additional information to the information processing apparatus 5. In the case where it is determined by the inhibition determination unit 379 that the second additional information or the sound information cannot be acquired, the terminal side communication control unit 377 neglects the request for the second additional information from the main body side communication control unit 158.

Specifically, the position determination unit 372 determines the position and azimuth of the imaging unit 33 based on the detection result of the detection unit 34. For example, the position determination unit 372 can determine whether or not the imaging unit 33 is located in an imaging inhibited area which is preset as an inhibition condition. The sound analysis unit 381 analyzes sound information recorded by the sound recording unit 35. The sound determination unit 382 determines various conditions based on sound analysis results of the sound analysis unit 381. The sound determination unit 382 can determines whether or not the sound information includes a particular keyword which is preset as an inhibition condition. Based on the determination results of the position determination unit 372 and the sound determination unit 382, the inhibition determination unit 379 can determines whether or not an inhibition condition is satisfied. In other words, the inhibition determination unit 379 determines based on inhibition conditions whether or not the second additional information or the sound information cannot be acquired. In the case where the inhibition determination unit 379 determines that the second additional information or the sound information cannot be acquired, since the request for the second additional information is neglected, taken image information and sound information corresponding to an inhibition condition are not transmitted to the information processing apparatus 5. As a result, the taken image information and sound information corresponding to inhibition conditions are discarded.

The arithmetic unit 378 calculates the rate at which virtual sight lines connecting between a virtual imaging object and the imaging unit 33 of each electronic apparatus 3 along a virtual imaging direction generated with reference to the positional information and azimuth information of the imaging unit 33 concentrate on the setting area. The threshold value is stored in the terminal side storage unit 36. If the arithmetic unit 378 calculates the rate before the main body side communication control unit 158 requests the second additional information, the terminal side communication control unit 377 transmits the second additional information to the information processing apparatus 5 in accordance with whether or not the rate is greater than or equal to the threshold value.

The sound analysis unit 381 can analyze sounds generated from the sound information recorded by the sound recording unit 35. The image analysis unit 331 can analyze images generated from the image information taken by the imaging unit 33.

The image determination unit 332 determines whether or not a predetermined value is exceeded by the similarity degree of the image information taken by the imaging unit 33 with reference to the analysis result of the image analysis unit 331. If the inhibition determination unit 379 determines that the predetermined value is exceeded by the similarity degree of the taken image information, the terminal side communication control unit 377 transmits the taken image information to the information processing apparatus 5 as the second additional information. If it is determined with reference to the analysis result of the image analysis unit 331 that the taken image information corresponds to a person's face or the material generated from the master information, the terminal side communication control unit 377 discards the taken image information.

When the information processing apparatus 5 requests the second additional information which is imaged by the imaging unit 33, while transmitting the positional information and azimuth information detected by the detection unit 34 to the information processing apparatus 5, the terminal side communication control unit 377 transmits the second additional information and the imaging time information in which the second additional information is imaged, to the information processing apparatus 5.

Figure 6:
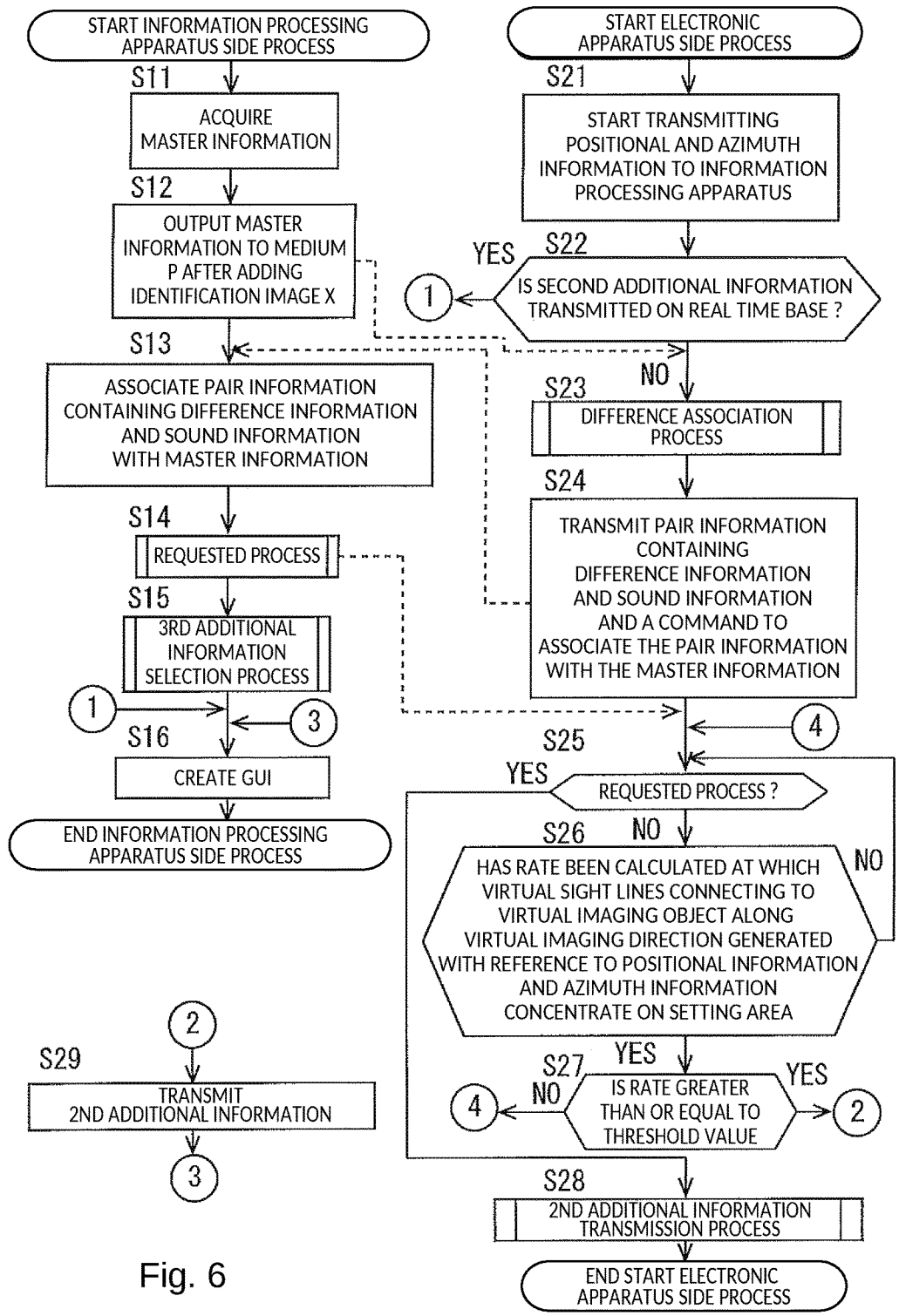
FIG. 6 is a flow chart for explaining an example of controlling in accordance with the embodiment of the present invention.

FIG. 6 is a flow chart for explaining an example of controlling in accordance with the embodiment of the present invention. In FIG. 6, the electronic apparatus 3 extracts, as a difference, an additional matter which is added to a paper medium P output by the information processing apparatus 5, and the electronic apparatus 3 associates the difference with the recorded data, which is recorded when the difference is extracted, and transmit the associated difference and recorded data to the information processing apparatus 5. The electronic apparatus 3 transmits the positional information and azimuth information of the imaging unit 33 to the information processing apparatus 5. The information processing apparatus 5 requests the second additional information from the electronic apparatus 3 based on the positional information and azimuth information of the imaging unit 33. The information processing apparatus 5 selects the third additional information from among a plurality of items of the second additional information and display an interface image through which it is possible to mutually refer the difference information, the sound information, the master information and the third additional information.

Incidentally, the processes from step S11 to step S16 are performed by the information processing apparatus 5. On the other hand, the processes from step S21 to step S29 are performed by the electronic apparatus 3.

In step S11, the master information is acquired. The master information may be stored in the main body side storage unit 27 or acquired anew through the network 9. In step S12, the meeting content contained in the master information is output to a paper medium P after adding the identification image X thereto. After the process in step S12, step S23 becomes viable.

In step S21, a process of transmitting the positional information and azimuth information of the imaging unit 33 to the information processing apparatus 5 is started. The positional information and azimuth information of the imaging unit 33 is transmitted in a predetermined transmission cycle. The predetermined transmission cycle can be readily adjusted by a system manager or a user. In step S22, it is determined whether or not the second additional information is transmitted on a real time base. If it is determined that the second additional information is transmitted on a real time base, the process proceeds to step S16. Conversely, if it is determined that the second additional information is not transmitted on a real time base, the process proceeds to step S23.

In step S23, a difference association process is performed. This process will be explained later in detail. In step S24, the pair information containing difference information and sound information and a command to associate the pair information with the master information are transmitted. After transmitting the pair information and the association command from the electronic apparatus 3 to the information processing apparatus 5 in step S24, step S13 becomes viable.

In step S13, the pair information containing the difference information and the sound information is associated with the master information. In step S14, the requesting process is performed. This process will be explained later in detail. In step S15, the third additional information selection process is performed. This process will also be explained later in detail. In step S16, a GUI is created. Namely, the above interface image is output in this step S16.

In step S25, it is determined whether or not there is a requesting process. If it is determined that there is a requesting process, the process proceeds to step S28. In step S28, a second additional information transmission process is performed. This process will be explained later in detail.

Conversely, it is determined that there is no requesting process, the process proceeds to step S26. In step S26, it is determined whether or not the rate has been calculated at which virtual sight lines connecting between a virtual imaging object and the imaging unit 33 along a virtual imaging direction generated with reference to the positional information and azimuth information of the imaging unit 33 concentrate on the setting area. If it is determined that the rate has been calculated at which virtual sight lines connecting between a virtual imaging object and the imaging unit 33 along a virtual imaging direction generated with reference to the positional information and azimuth information of the imaging unit 33 concentrate on the setting area, the process proceeds to step S27. Conversely, if it is determined that the rate has not been calculated yet at which virtual sight lines connecting between a virtual imaging object and the imaging unit 33 along a virtual imaging direction generated with reference to the positional information and azimuth information of the imaging unit 33 concentrate on the setting area, the process returns to step S25.

In step S27, it is determined whether or not the rate is greater than or equal to the threshold value. If the rate is greater than or equal to the threshold value, the process proceeds to step S29. Conversely, if the rate is not greater than or equal to the threshold value, the process returns to step S25.

Figure 7:
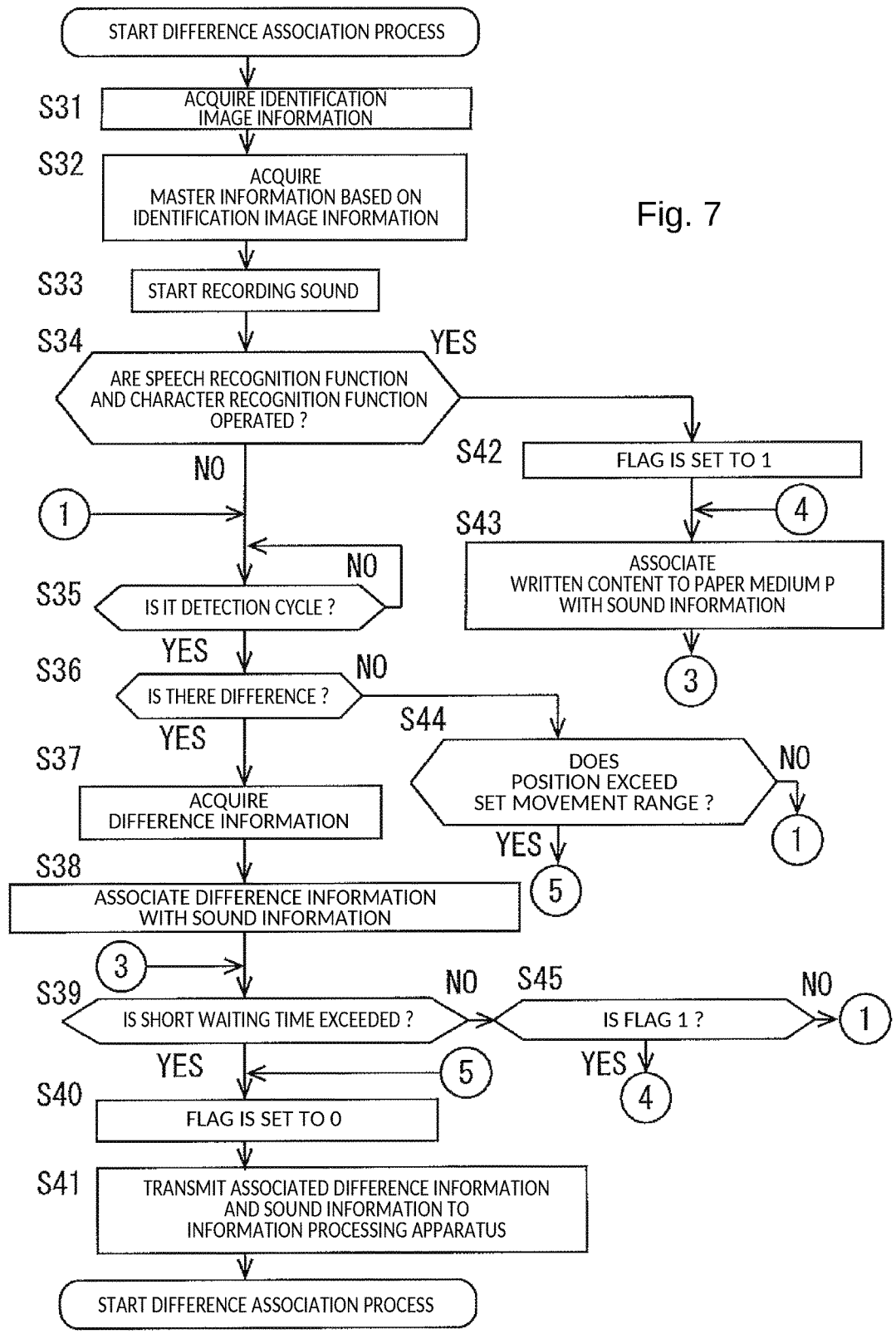
FIG. 7 is a flow chart for explaining a difference association process in accordance with the embodiment of the present invention.
Figure 8:
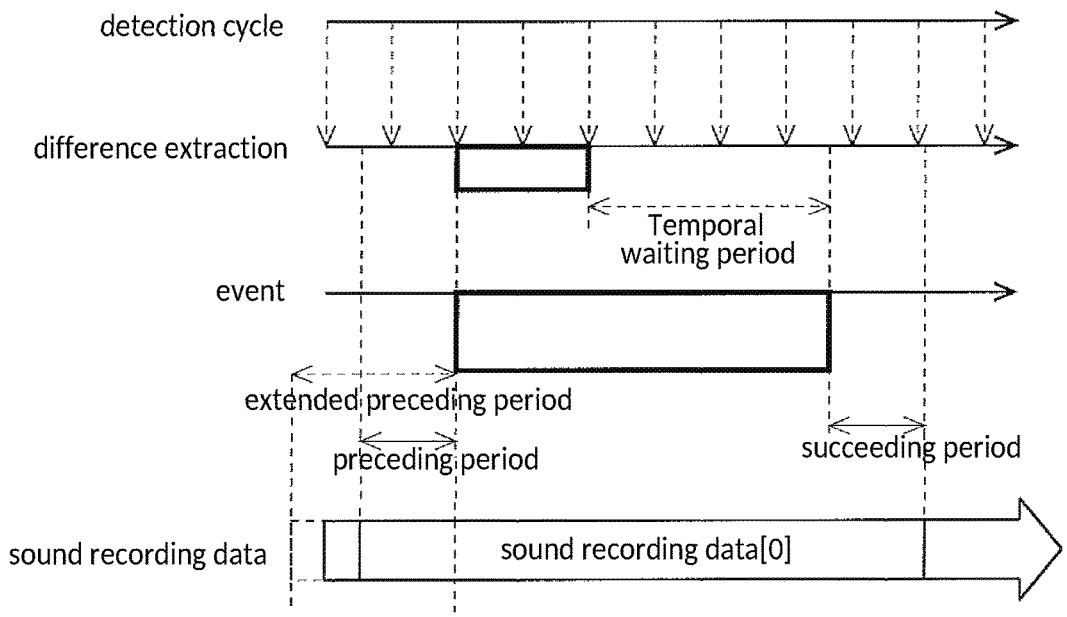
FIG. 8 is a schematic diagram for showing an example that an event is determined a temporal waiting period after a difference is extracted in accordance with the embodiment of the present invention.
Figure 9:
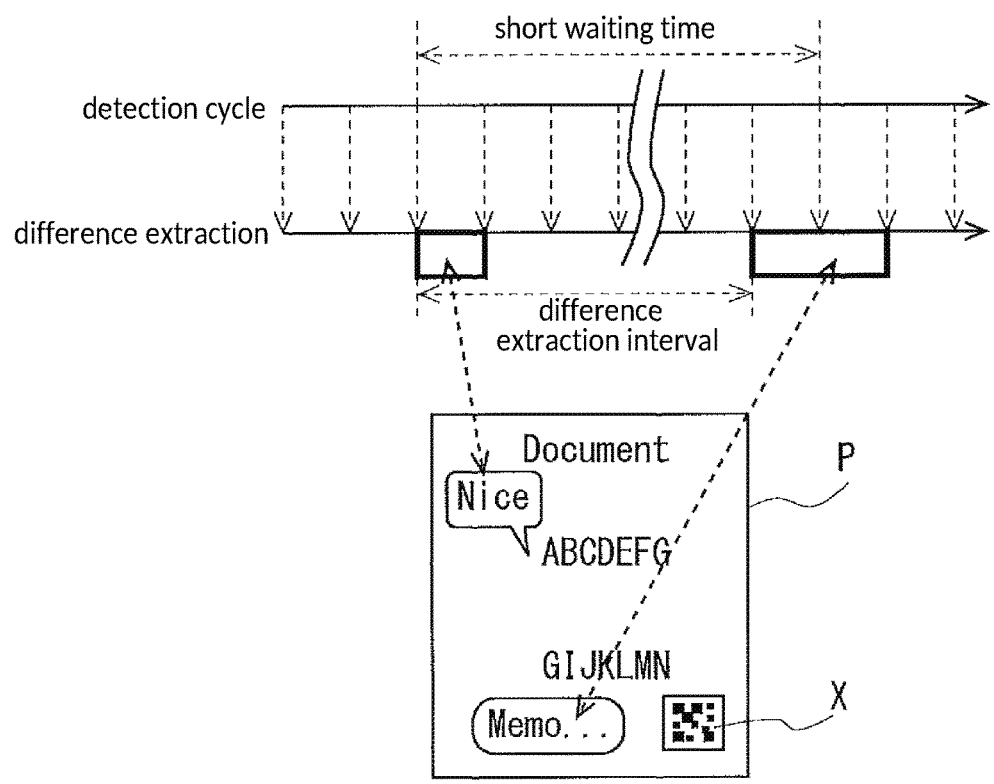
FIG. 9 is a schematic diagram for showing an example that a short waiting time is not exceeded by an interval at which a difference is extracted in accordance with the embodiment of the present invention.
Figure 10:
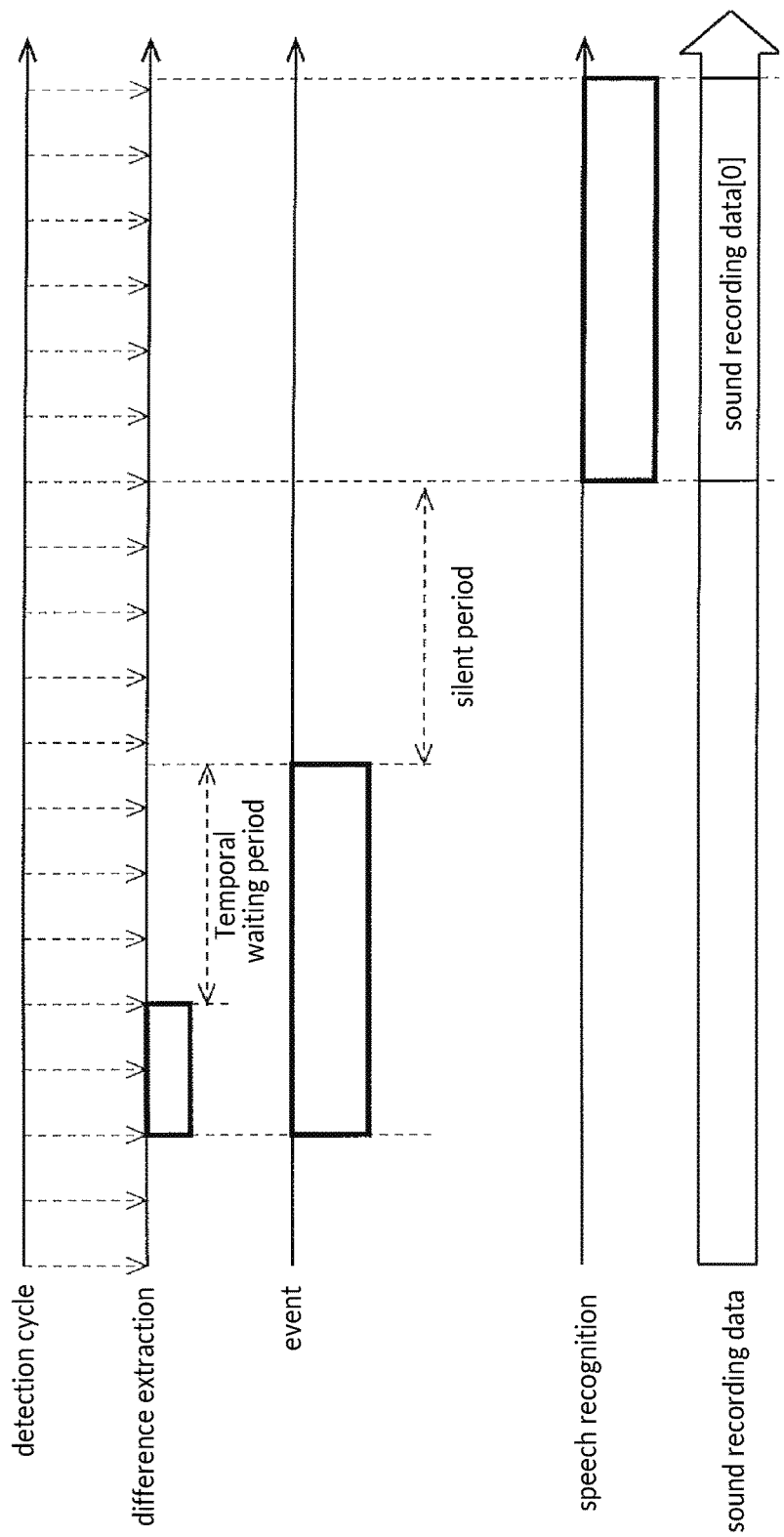
FIG. 10 is a schematic diagram for showing an example of a speech timing in accordance with the embodiment of the present invention.

FIG. 7 is a flow chart for explaining the difference association process in accordance with the embodiment of the present invention. FIG. 8 is a schematic diagram for showing an example that an event is determined a temporal waiting period after the difference is extracted in accordance with the embodiment of the present invention. FIG. 9 is a schematic diagram for showing an example that a short waiting time is not exceeded by an interval at which the difference is extracted in accordance with the embodiment of the present invention. FIG. 10 is a schematic diagram for showing an example of a speech timing in accordance with the embodiment of the present invention.

In FIG. 7, either a process of extracting differences at each detection cycle and associating the extracted differences with sounds and a process of associating sounds with characters when these sounds and characters are recognized, is performed.

In step S31, identification image information is acquired. The identification image information is contained in the taken image information which is generated when the imaging unit 33 takes an identification image X. Namely, the identification image information is extracted from the taken image information in correspondence with the identification image X.

In step S32, the master information is acquired based on the identification image information. The identification image information contains the storage destination information of the master information as attribute information of the master information. Accordingly, after extracting the storage destination information of the master information from the identification image information, the electronic apparatus 3 can acquire the master information through the network 9. The master information acquired through the network 9 is used as base data for determining whether or not there occurs a difference accompanying the progress of a meeting.

In step S33, sound recording is started by the sound recording unit 35. This sound recording may be manually started or automatically started with a timer or the like when the meeting begins.

In step S34, it is determined whether or not the speech recognition function and the character recognition function are operated. If it is determined that the speech recognition function and the character recognition function are operated, the process proceeds to step S42. Conversely, if it is determined that the speech recognition function and the character recognition function are not operated, the process proceeds to step S35.

In step S35, it is determined whether or not it is a detection cycle. If it is determined that it is a detection cycle, the process proceeds to step S36. Conversely, if it is determined that it is not a detection cycle, step S35 is repeated.

In step S36, it is determined whether or not there is a difference. If it is determined that there is a difference, the process proceeds to step S37. Conversely, if it is determined that there is no difference, the process proceeds to step S44.

In step S37, difference information is acquired. The difference information is information extracted based on the taken image information. Accordingly, it is preferred to extract, as the difference information, a position in which the difference occurs and an image containing the difference. If the image containing the difference is extracted, an additional matter can be identified by analyzing this image.

In step S38, the difference information is associated with sound information. The sound information is sound recording data which is recorded when a difference occurs. Association is performed in a unit of each event. Specifically, as illustrated in FIG. 8, the event management unit 371 manages the differences extracted by the extracting unit 375 in units of events. An event serves as an indicator showing a change in the taken image information in the progress of a meeting, starts when a difference is extracted, and terminates if no difference is extracted anew for a temporal waiting period. Accordingly, the extracting unit 375 extracts sound information in correspondence with an event managed by the event management unit 371. The terminal side association processing unit 376 associates the sound information with the difference information for each event.

More specifically, the terminal side association processing unit 376 has a sound information clipping period include a preceding period before starting an event and a succeeding period after terminating the event. The preceding period before starting an event starts a predetermined time before it is confirmed that a difference is extracted to recognize a change made to an output object as a paper medium P. On the other hand, the succeeding period after terminating the event terminates a predetermined time after the temporal waiting period in which the output object is not changed. Namely, the sound information clipping period includes a period from a predetermined time before an event to a predetermined time after the event.

Incidentally, it is preferred to store the master information, the differential image data between the master information and the taken image information and the date and time information in association with each other.

In step S39, it is determined whether or not a short waiting time is exceeded. The short waiting time is a timely threshold which is used to determine whether or not another meeting is started. If the short waiting time is exceeded, it is recognized that another meeting is started. Specifically, if it is determined that the short waiting time is exceeded, the process proceeds to step S40. Conversely, if it is determined that the short waiting time is not exceeded, the process proceeds to step S45.

That is, if the short waiting time is not exceeded by a difference extraction interval at which differences are extracted as illustrated in FIG. 9, the extracting unit 375 extracts the differences with reference to the same master information.

In step S40, a flag is set to 0. In step S41, the associated difference information and sound information are transmitted to the information processing apparatus 5.

In step S42, the flag is set to 1. In step S43, written content to the paper medium P is associated with the sound information, and the process proceeds to step S39. Specifically, if a silent state is continued after an event occurs as illustrated in FIG. 10, the terminal side association processing unit 376 starts extracting sound information with the timing when the speech recognition unit 38 recognizes a speech. Namely, when the character recognition unit 32 detects start of writing characters to the paper medium P, and the speech recognition unit 38 detects a speech to be recognized, the terminal side association processing unit 376 associates sound information and characters written to the paper medium P with each other in preference to the timing with which a difference is extracted in the detection cycle.

In step S44, it is determined whether or not the position of the electronic apparatus 3 exceeds a set movement range. If it is determined that the position of the electronic apparatus 3 exceeds the set movement range, the process proceeds to step S40. Conversely, if it is determined that the position of the electronic apparatus 3 does not exceed the set movement range, the process proceeds to step S35. Specifically, if the position of the electronic apparatus 3 does not exceed the set movement range with reference to the determination result of the position determination unit 372, the extracting unit 375 extracts a difference based on the same master information.

In step S45, it is determined whether or not the flag is 1. If it is determined that the flag is 1, the process proceeds to step S43. Conversely, if it is determined that the flag is not 1, the process proceeds to step S35.

In short, a difference is extracted based on the same master information if the first condition that the position of the electronic apparatus 3 is within the set movement range in step S44 or the second condition that the difference extraction interval is within the short waiting time in step S39 is satisfied. In other words, as long as the above first or second condition is satisfied, preferably, a plurality of differential image data items and audio data items are stored in association with a single master information and the date and time information corresponding thereto.

Also, as long as the above first or second condition is satisfied, the electronic apparatus 3 need not always capture the identification image X. Furthermore, when a plurality of meeting materials have different identification images X added respectively thereto, and the electronic apparatus 3 captures these identification images X respectively, the set movement range and the short waiting time are dynamically changed in accordance with the number of meeting materials captured by the electronic apparatus 3.

For example, when the electronic apparatus 3 discontinuously captures the identification image X while, in the situation that no difference is extracted after a difference is lastly extracted, it is detected that a difference is extracted in the next detection cycle, sound recording data is clipped and saved by tracking back for a longer time than in usual cases. Namely, the preceding period shown in FIG. 8 is extended as an extended preceding period so that the start time of clipping sound recording data is set to an earlier time.

Specifically, if the short waiting time is not exceeded by a difference extraction interval at which differences are extracted, or if the position of the electronic apparatus 3 does not exceed the set movement range and differences are extracted, the terminal side association processing unit 376 sets the preceding period before starting an event to the extended preceding period. Incidentally, the extended preceding period can appropriately be changed in accordance with the condition of a meeting, the amount of a meeting material and so forth.

Also, the detection cycle, the temporal waiting period or the sound information clipping period can freely be changed. Furthermore, the short waiting time or the set movement range can freely be changed. In other words, if the short waiting time is not exceeded by the difference extraction interval, or if the position of the electronic apparatus 3 does not exceed the set movement range, these parameters can freely and dynamically be changed within a change allowable range in accordance with the number of sheets contained in the paper medium P on which print images are formed. The change allowable range may be set in accordance with a necessary time and movement range for discontinuously capturing the identification image X.

Incidentally, if a difference disappears while a meeting is being held, the association between this difference and sounds is dissolved. For example, this occurs when an additional matter which has been added is deleted during a meeting.

When the above first or second condition becomes no longer satisfied, the differential image data in periods before and after changes of the master information, the sound recording data recorded when the changes are made, and the relevant date and time data are transmitted to the information processing apparatus 5 which is the storage destination of the master information through the network 9.

Incidentally, when the electronic apparatus 3 is not connected to the network 9, the electronic apparatus 3 temporarily stores pair information in the terminal side storage unit 36, and the pair information is transmitted to the information processing apparatus 5 through the network 9 as soon as the electronic apparatus 3 is connected to the network 9. Specifically, based on the storage destination information of the master information, the terminal side communication control unit 377 of the electronic apparatus 3 acquires the master information which is used to extract differences with the extracting unit 375. On the other hand, the information determination unit 152 of the information processing apparatus 5 determines whether or not pair information is transmitted.

More specifically, when the terminal side communication control unit 377 does not establish communication with the information processing apparatus 5, pair information is saved so that, when the communication is established, the terminal side communication control unit 377 transmits the pair information to the information processing apparatus 5. On the other hand, when the information determination unit 152 determines that pair information is transmitted, the main body side association processing unit 153 associates the pair information with the master information.

Figure 11:
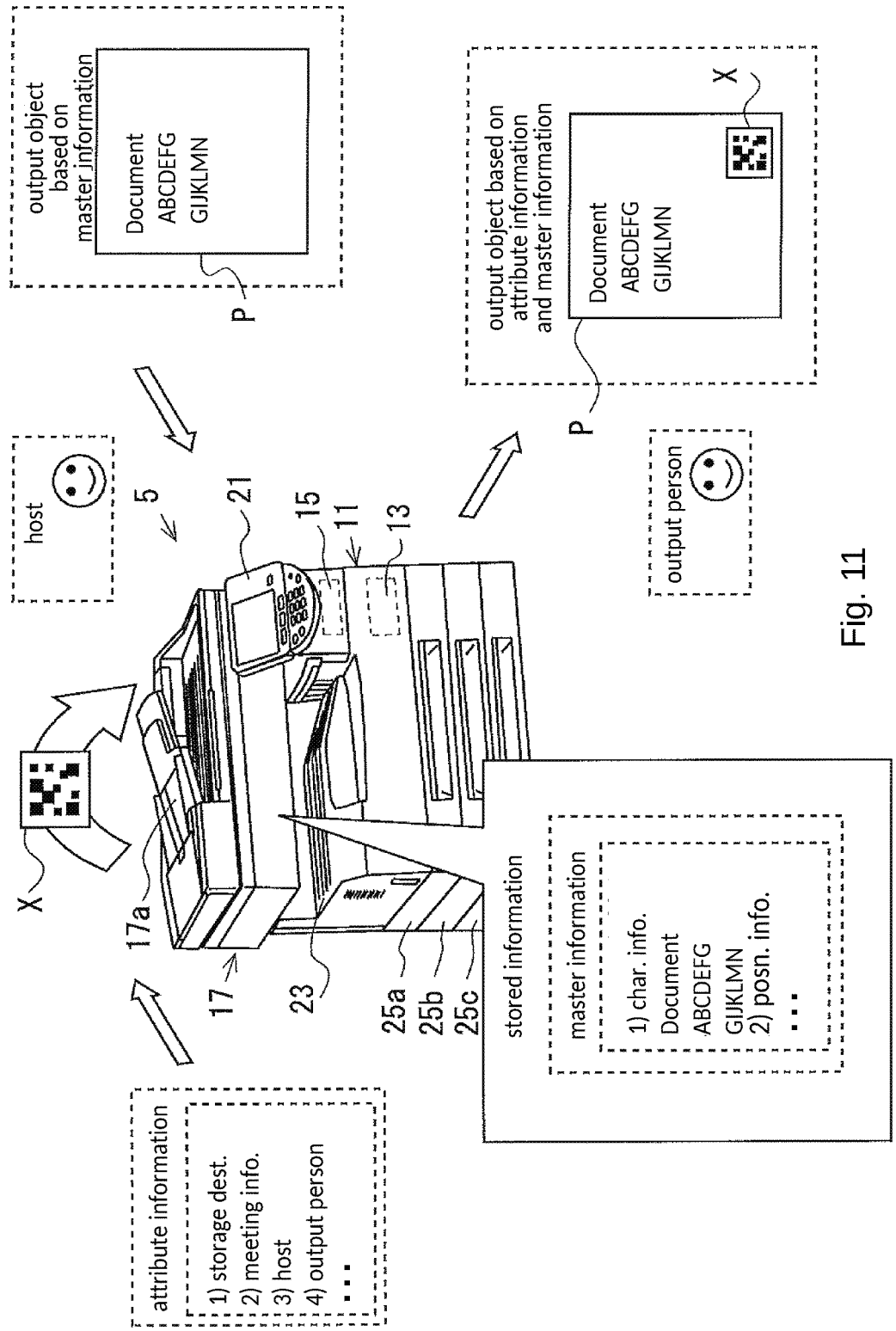
FIG. 11 is a schematic diagram for showing an example of outputting a two-dimensional code in accordance with the embodiment of the present invention.

Next, the process of associating difference information, sound information and an output person with each other will be conceptually explained with reference to FIG. 11 through FIG. 13. FIG. 11 is a schematic diagram for showing an example of outputting a two-dimensional code in accordance with the embodiment of the present invention. As illustrated in FIG. 11, an output object is output as a paper medium P with an identification image X based on the master information which is stored in the main body side storage unit 27 and the identification image X which is formed from the attribute information of the master information.

Figure 12:
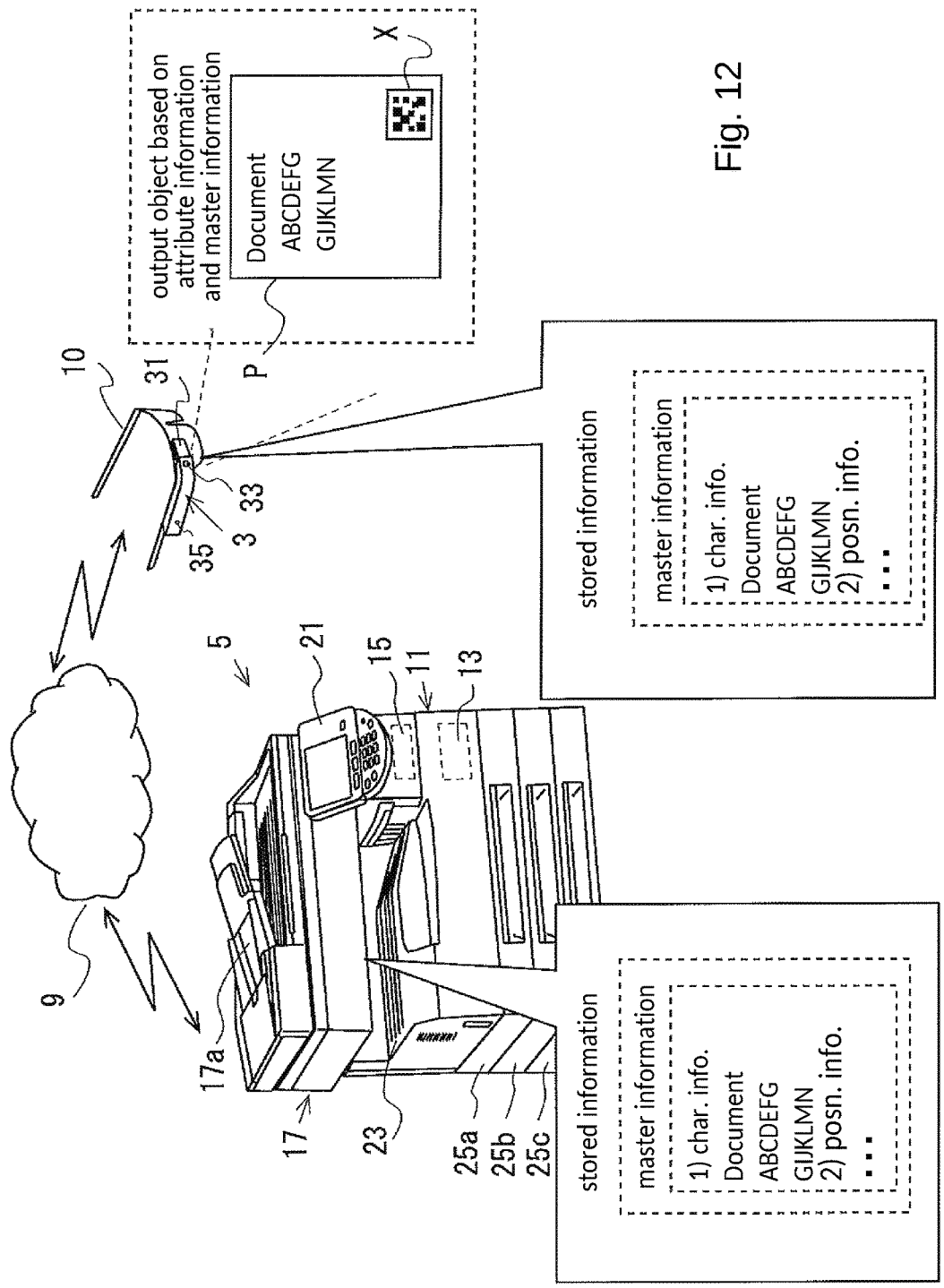
FIG. 12 is a schematic diagram for showing an example of acquiring master information in accordance with the embodiment of the present invention.
Figure 13:
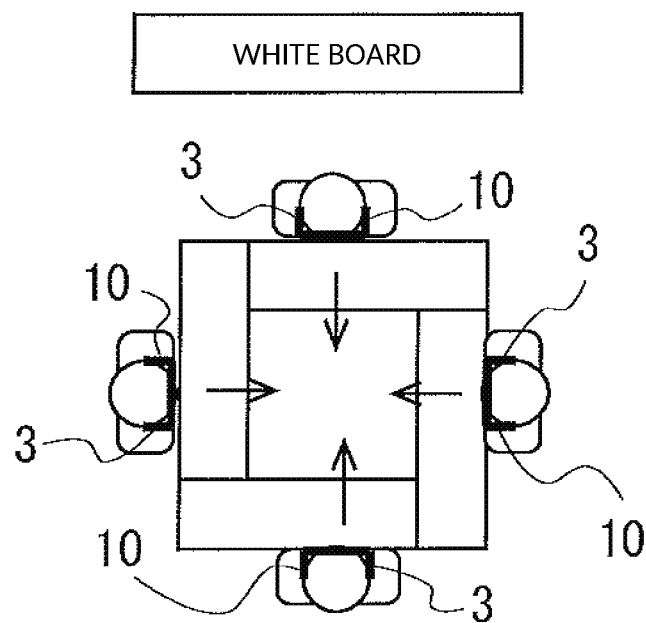
FIG. 13 is a schematic diagram for showing an example in which the sight lines of participants I to IV of a meeting are oriented toward the center in accordance with the embodiment of the present invention.

FIG. 12 is a schematic diagram for showing an example of acquiring the master information in accordance with the embodiment of the present invention. As illustrated in FIG. 12, based on the attribute information contained in the identification image X, the electronic apparatus 3 stores the master information held by the main body side storage unit 27 of the information processing apparatus 5 in the terminal side storage unit 36.

Next, concentration of sight lines will be explained with reference to FIGS. 13 to 16. FIG. 13 shows an example in which the sight lines of participants I to IV of a meeting are oriented toward the center in accordance with the embodiment of the present invention. As illustrated in FIG. 13, each of the participants I to IV of the meeting is wearing eyeglasses 10 on which the electronic apparatus 3 is mounted. In other words, each of the participants I to IV of the meeting is wearing smart eyeglasses. In this example shown in FIG. 13, each of the participants I to IV of the meeting concentrates sight lines on the center of a table. Namely, in FIG. 13, it is assumed that all the participants I to IV of the meeting face the same object to be imaged.

Figure 14:
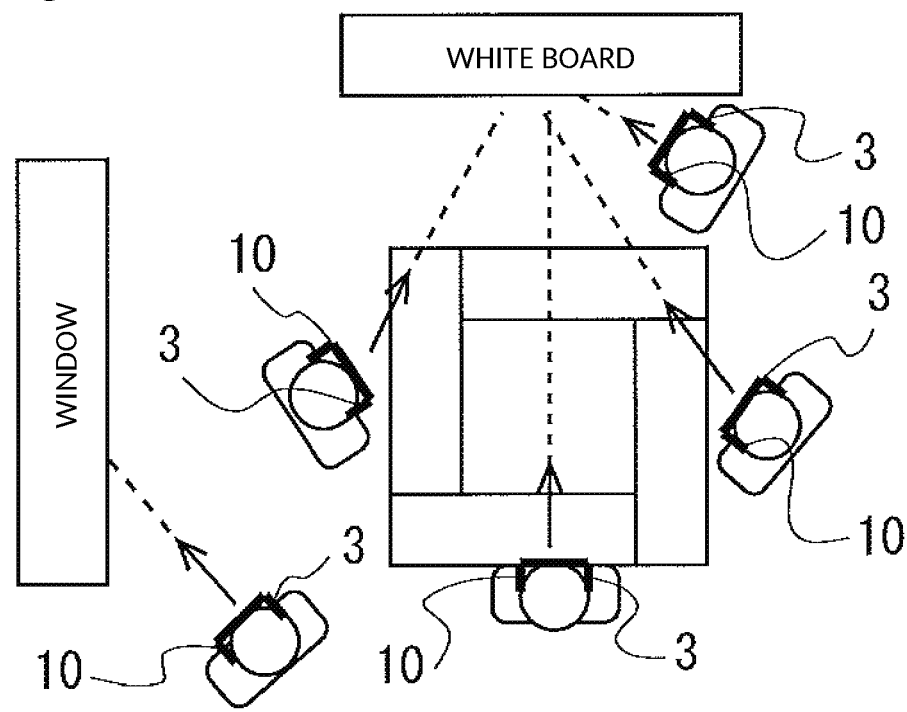
FIG. 14 is a schematic diagram for showing an example in which the sight lines of the participants I to V of a meeting are directed to a white board in accordance with the embodiment of the present invention.

FIG. 14 shows an example in which the sight lines of the participants I to V of a meeting are directed to a white board in accordance with the embodiment of the present invention. As illustrated in FIG. 14, like FIG. 13, each of the participants I to V of the meeting is wearing smart eyeglasses. In this example shown in FIG. 14, of the participants I to V of the meeting, a participant V directs sight lines to a window. On the other hand, of the plurality of participants I to V of the meeting, the other participants I to IV direct their sight lines to the white board. Namely, in FIG. 14, it is assumed that, of the participants I to V of the meeting, some participants face the same object to be imaged, and the other participant faces a different object to be imaged.

Figure 15:
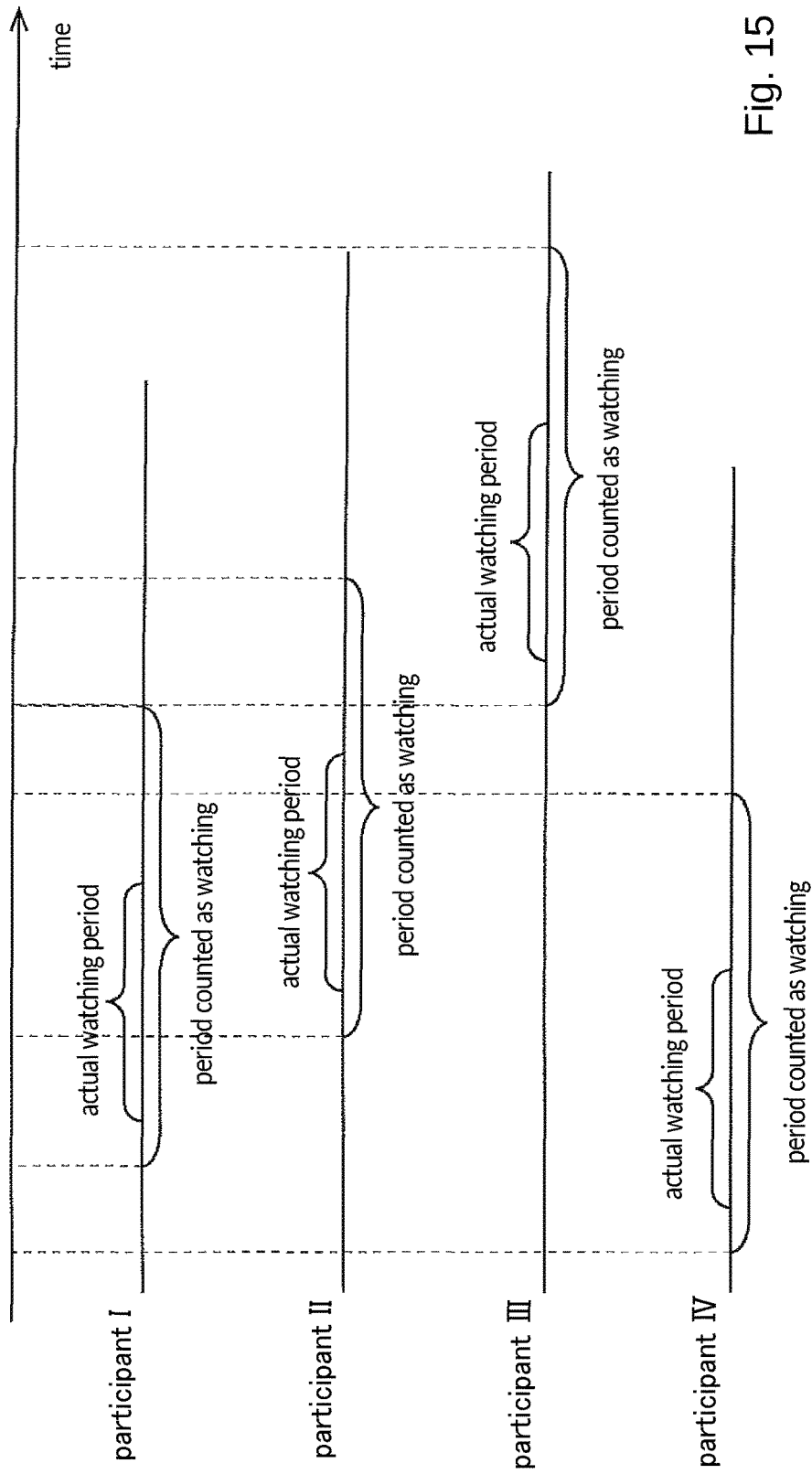
FIG. 15 is a schematic diagram for showing an example in which sight line concentration is determined by overlapping time periods in which the participants I to IV of the meeting concentrate sight lines respectively.
Figure 16:
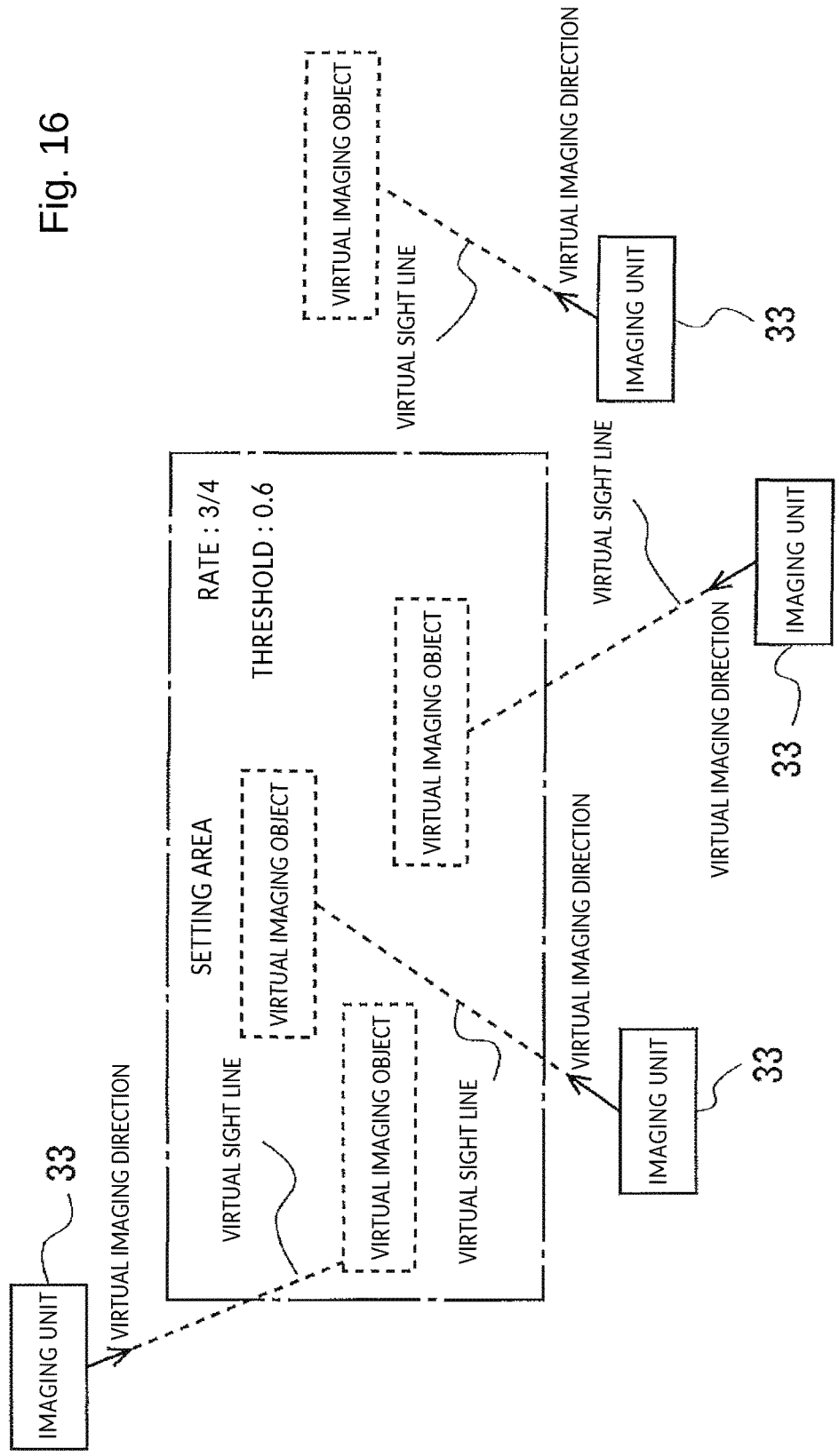
FIG. 16 is a schematic diagram for showing a conceptual example of the rate at which virtual sight lines connecting a virtual imaging object with an imaging unit along a virtual imaging direction generated with reference to positional information and azimuth information concentrate on the setting area.

Then, FIGS. 15 and 16 are referred to examine the rate of the plurality of participants I to IV of the meeting concentrating sight lines. FIG. 15 shows an example in which sight line concentration is determined by overlapping time periods in which the participants I to IV of the meeting concentrate sight lines respectively. As illustrated in FIG. 15, the participants I to IV of the meeting actually watch in different time periods respectively. Then, the time period counted as watching is defined as the actual watching time period with additional times before and after it. When the time periods counted as watching overlap each other, it can be recognized that sight lines are concentrated. Incidentally, the actual watching time period can be determined as a time period in which the positional information and azimuth information of the imaging unit 33 are not changed within a setting error range.

FIG. 16 shows a conceptual example of the rate at which virtual sight lines connecting a virtual imaging object with the imaging unit 33 along a virtual imaging direction generated with reference to the positional information and azimuth information concentrate on the setting area. The virtual imaging direction is generated with reference to the positional information and azimuth information of the imaging unit 33. The virtual imaging object can be recognized to be located in the direction corresponding to the virtual imaging direction.

Specifically, whether or not the participants I to IV of the meeting concentrate sight lines can be determined by determining whether or not virtual sight lines are concentrated in accordance with whether or not the rate of the virtual sight lines concentrated on a predetermined setting area is greater than or equal to a threshold value. In the case of the example shown in FIG. 16, the rate of the virtual sight lines concentrated on the setting area is 3/4, and the threshold value is set to 0.6, so that the rate of the virtual sight lines concentrated on the setting area is greater than the threshold value. In this case, it is determined that the participants I to IV of the meeting actually concentrate sight lines, and therefore the second additional information is requested from the electronic apparatuses 3 respectively.

Figure 17:
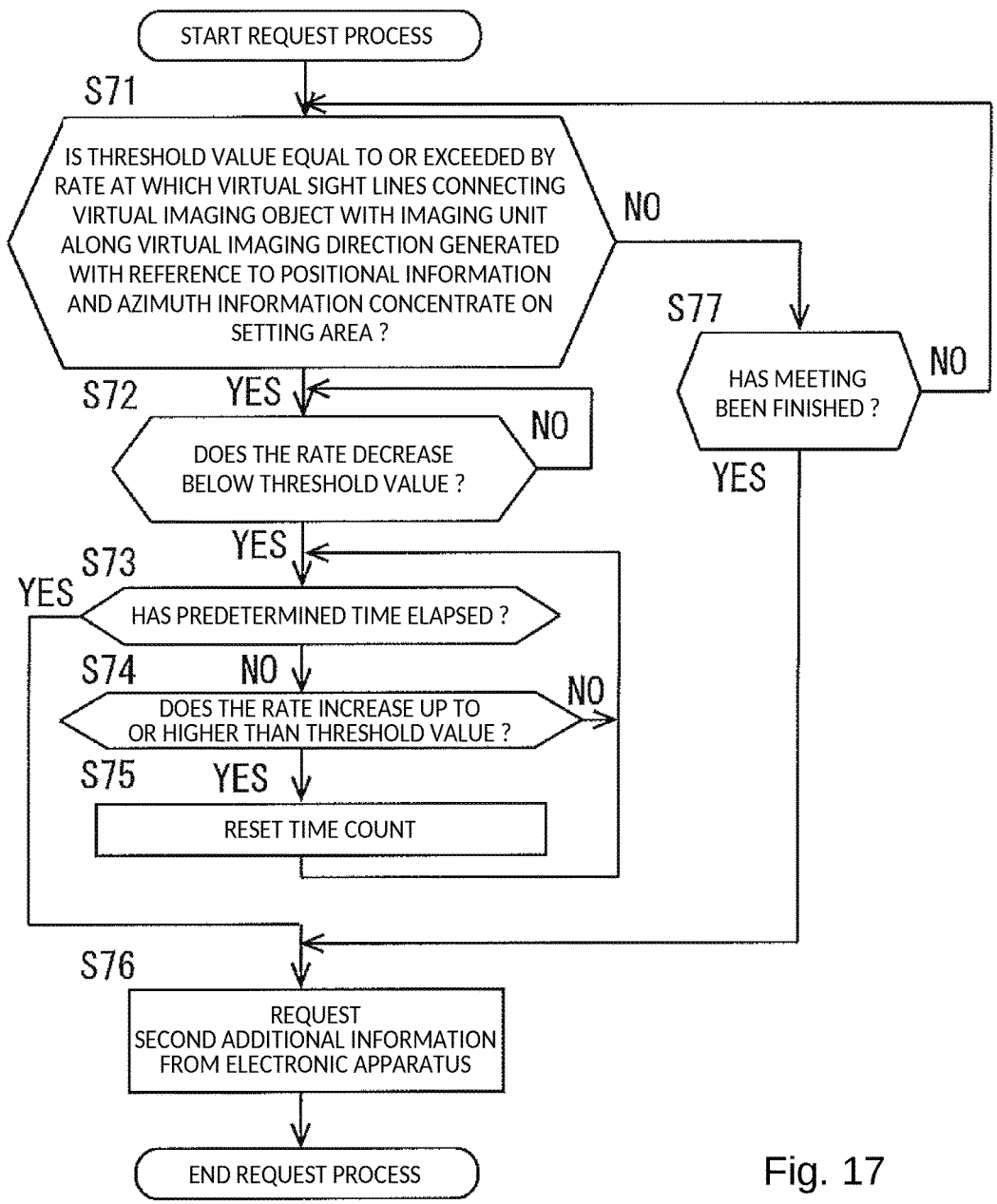
FIG. 17 is a flow chart for explaining a requesting process in accordance with the embodiment of the present invention.

The process of requesting the second additional information from the electronic apparatus 3 will be explained in detail with reference to FIG. 17. FIG. 17 is a flow chart for explaining the requesting process in accordance with the embodiment of the present invention. Meanwhile, in the following explanation, the process in step S76 is performed after the determination processes in steps S71, S72 and S73, and the process in step S76 is performed after the processes in steps S71 and S77. However, the process in step S76 can be performed after the process in step S71 while the processes in steps S72 and S73 are not performed after the process in step S71.

In step S71, it is determined whether or not the threshold value is equal to or exceeded by the rate at which virtual sight lines connecting a virtual imaging object with the imaging unit 33 along a virtual imaging direction generated with reference to the positional information and azimuth information concentrate on the setting area. If it is determined that the threshold value is equal to or exceeded by the rate at which virtual sight lines connecting a virtual imaging object with the imaging unit 33 along a virtual imaging direction generated with reference to the positional information and azimuth information concentrate on the setting area, the process proceeds to step S72. Conversely, if it is determined that the threshold value is greater than the rate at which virtual sight lines connecting a virtual imaging object with the imaging unit 33 along a virtual imaging direction generated with reference to the positional information and azimuth information concentrate on the setting area, the process proceeds to step S77.

In step S72, it is determined whether or not there occurs a decrease lower than the threshold value in the rate at which virtual sight lines connecting a virtual imaging object with the imaging unit 33 along a virtual imaging direction generated with reference to the positional information and azimuth information concentrate on the setting area. If there occurs a decrease lower than the threshold value in the rate at which virtual sight lines connecting a virtual imaging object with the imaging unit 33 along a virtual imaging direction generated with reference to the positional information and azimuth information concentrate on the setting area, the process proceeds to step S73. Conversely, if there does not occur such a decrease in the rate at which virtual sight lines connecting a virtual imaging object with the imaging unit 33 along a virtual imaging direction generated with reference to the positional information and azimuth information concentrate on the setting area that the rate becomes lower than the threshold value, step S72 is repeated.

In step S73, it is determined whether or not a predetermined time has elapsed. If it is determined that a predetermined time has elapsed, the process proceeds to step S76. Conversely, if it is determined that a predetermined time has not elapsed, the process proceeds to step S74.

In step S74, it is determined whether or not there occurs an increase up to or higher than the threshold value in the rate at which virtual sight lines connecting a virtual imaging object with the imaging unit 33 along a virtual imaging direction generated with reference to the positional information and azimuth information concentrate on the setting area. If it is determined that there occurs an increase up to or higher than the threshold value in the rate at which virtual sight lines connecting a virtual imaging object with the imaging unit 33 along a virtual imaging direction generated with reference to the positional information and azimuth information concentrate on the setting area, the process proceeds to step S75. Conversely, if it is determined that there does not occur such an increase in the rate at which virtual sight lines connecting a virtual imaging object with the imaging unit 33 along a virtual imaging direction generated with reference to the positional information and azimuth information concentrate on the setting area that the rate becomes no lower than the threshold value, the process returns to step S73.

In step S75, the predetermined time is reset, and the process returns to step S73.

In step S76, the electronic apparatus 3 is requested to transmit second additional information, and the requesting process is finished. Specifically, the electronic apparatus 3 is requested to transmit second additional information which is image information taken by the imaging unit 33, imaging time information indicative of an imaging time when the second additional information is imaged, and sound information recorded corresponding to the imaging time or within a period around or before and after the imaging time. Incidentally, at this time, the sound information may not be transmitted.

In step S77, it is determined whether or not a meeting has been finished. If it is determined that a meeting has been finished, the process proceeds to step S76. Conversely, if it is determined that a meeting has not been finished, the process is returned to step S71.

Figure 18:
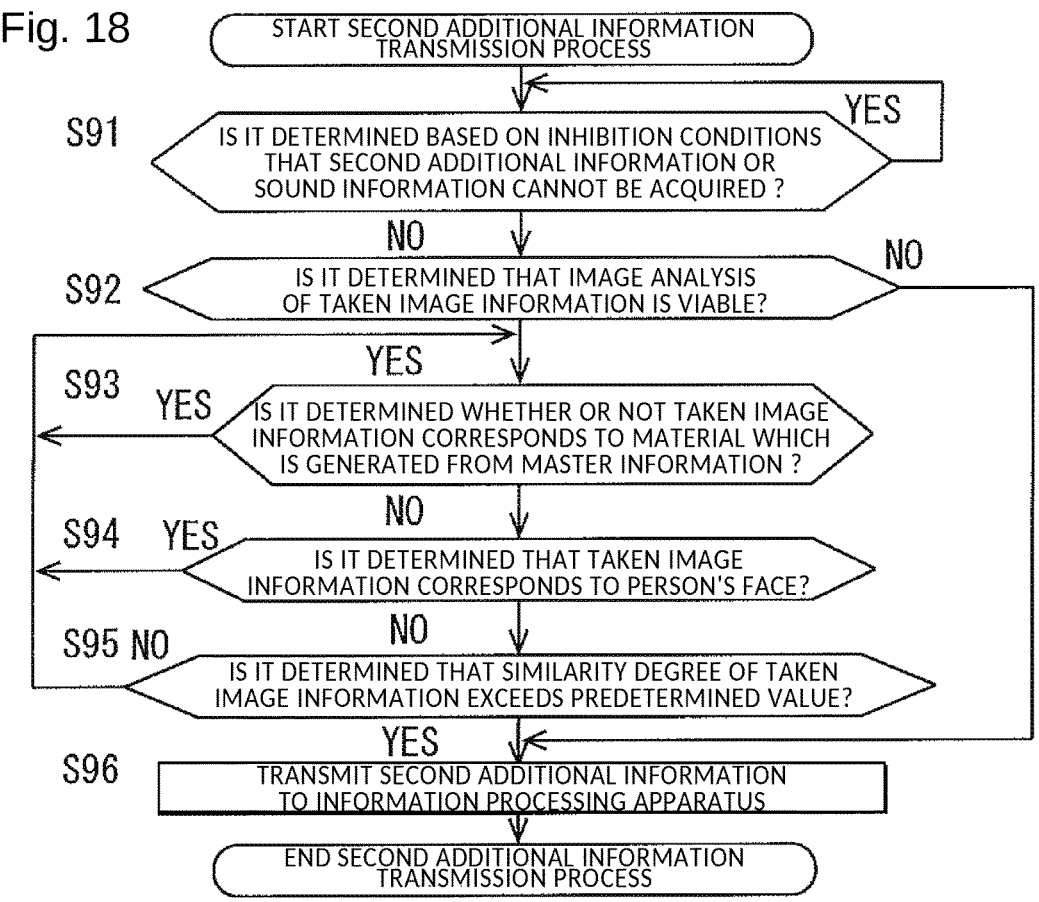
FIG. 18 is a flow chart for showing a second additional information transmission process in accordance with the embodiment of the present invention.

Next is an explanation of the process to transmit second additional information from the electronic apparatus 3 to the information processing apparatus 5 with reference to FIG. 18. FIG. 18 is a flow chart for showing a second additional information transmission process in accordance with the embodiment of the present invention. Incidentally, the process in steps S93 to S95 is performed in the case where an image identification function is implemented in the electronic apparatus 3. Accordingly, if an image identification function is implemented in the electronic apparatus 3, it can be determined from taken image information whether or not sight lines are concentrated.

In step S91, it is determined based on inhibition conditions whether or not the second additional information or the sound information cannot be acquired. If it is determined based on inhibition conditions that the second additional information or the sound information cannot be acquired, the process in step S91 is repeated. Namely, if it is determined based on inhibition conditions that the second additional information or the sound information cannot be acquired, the request for the second additional information is ignored by the main body side communication control unit 158. Conversely, if it is determined based on inhibition conditions that the second additional information or the sound information can be acquired, the process proceeds to step S92.

In step S92, it is determined whether or not image analysis of taken image information is viable. If it is determined that image analysis of the taken image information is viable, the process proceeds to step S93. Conversely, if it is determined that the image analysis of taken image information is not viable, the process proceeds to step S96.

In step S93, it is determined whether or not the taken image information corresponds to the material which is generated from the master information. If it is determined that the taken image information corresponds to the material which is generated from the master information, step S93 is repeated. Conversely, if it is determined that the taken image information does not correspond to the material which is generated from the master information, the process proceeds to step S94.

In step S94, it is determined whether or not the taken image information corresponds to a person's face. If it is determined that the taken image information corresponds to a person's face, the process is returned to step S93. Conversely, if it is determined that the taken image information does not correspond to a person's face, the process proceeds to step S95.

In step S95, it is determined whether or not the similarity degree of the taken image information exceeds a predetermined value. If it is determined that the similarity degree of the taken image information exceeds a predetermined value, the process proceeds to step S96. Conversely, if it is determined that the similarity degree of the taken image information does not exceed a predetermined value, the process is returned to step S93. In other words, it is determined from the taken image information whether or not sight lines are concentrated.

In step S96, second additional information is transmitted to the information processing apparatus 5, followed by terminating the second additional information transmission process. Specifically, second additional information which is image information taken by the imaging unit 33, imaging time information indicative of an imaging time when the second additional information is imaged, and sound information recorded corresponding to the imaging time or within a period around or before and after the imaging time, are transmitted to the information processing apparatus 5.

Figure 19:
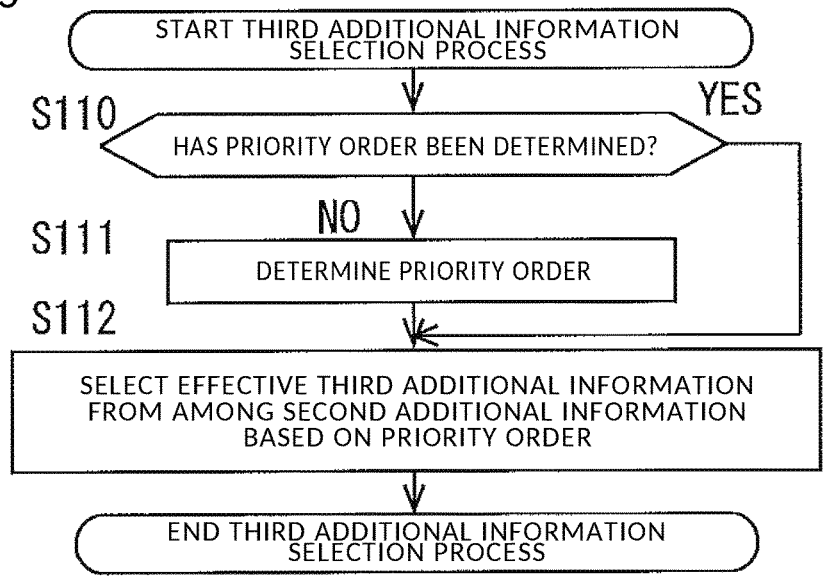
FIG. 19 is a flow chart for showing a third additional information selection process in accordance with the embodiment of the present invention.

Next is an explanation of the process to select effective third additional information from among second additional information with reference to FIG. 19. FIG. 19 is a flow chart for showing a third additional information selection process in accordance with the embodiment of the present invention.

In step S110, it is determined whether or not the order of priorities has been determined. If it is determined that the order of priorities has been determined, the process proceeds to step S112. Conversely, it is determined that the order of priorities has not been determined, the process proceeds to step S111.

In step S111, the order of priorities is determined. In step S112, effective third additional information is selected from among second additional information based on the order of priorities, followed by terminating the third additional information selection process.

Figure 20:
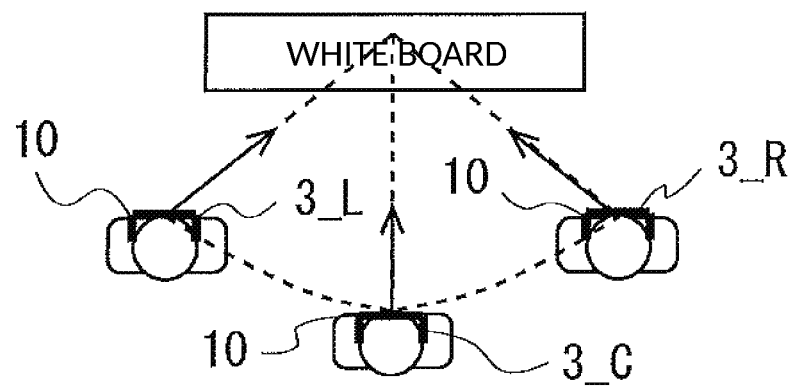
FIG. 20 is a schematic diagram for explaining an example of arrangement relation relating to selected image information candidates in accordance with the embodiment of the present invention.
Figure 21:
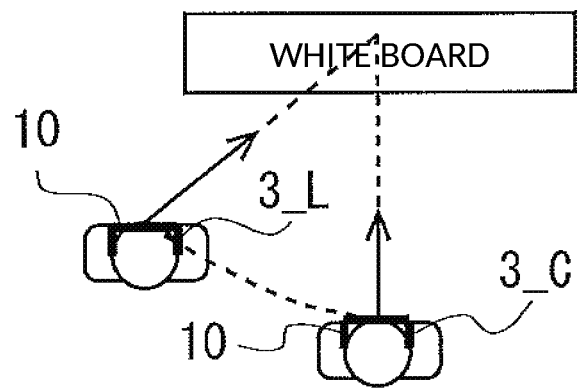
FIG. 21 is a schematic diagram for explaining another example of arrangement relation relating to selected image information candidates in accordance with the embodiment of the present invention.

Next, FIGS. 20 and 21 are referred to for explaining alternatives of selected image information candidates based on the order of priorities. FIG. 20 is a schematic diagram for explaining an example of arrangement relation relating to selected image information candidates in accordance with the embodiment of the present invention. FIG. 21 is a schematic diagram for explaining another example of arrangement relation relating to selected image information candidates in accordance with the embodiment of the present invention.

As shown in FIG. 20, the order of priorities is determined based on virtual sight lines and the distance between the imaging unit 33 and a virtual imaging object. Specifically, the highest priority is assigned to taken image information of the imaging unit 33 which is located on the center line extending from the center of a fan shape formed by the virtual sight lines extending from the electronic apparatus 3_C, 3_R and 3_L. Namely, the highest priority is assigned to the taken image information of the electronic apparatus 3_C.

Also, the order of priorities is determined in the case shown in FIG. 21 in the same manner as in FIG. 20. Specifically, the order of priorities is determined based on the angle from the center line of a fan shape formed by the virtual sight lines of the electronic apparatus 3_C and 3_L. In this case, the highest priority is assigned to the taken image information of the electronic apparatus 3_C.

In other words, as the angle formed by the virtual sight lines and the virtual imaging object approaches a right angle, the priority is increased of a selected image information candidate containing the third additional information. Incidentally, as explained above, the priority is determined also by taking into consideration the distortion of the imaging object imaged by the imaging unit 33 contained in the second additional information, the distance between the imaging unit 33 and the virtual imaging object or presence of an obstacle between the imaging unit 33 and the virtual imaging object. Of the above, the distortion of the imaging object imaged by the imaging unit 33 contained in the second additional information is, specifically, the degree of forming a trapezoidal of an object to be imaged in a taken image. The order of priorities is determined by appropriately weighting these factors.

Namely, the highest priority is assigned to the electronic apparatus 3 located in a position where the imaging object can most precisely be imaged.

Incidentally, the positional information and the azimuth information of the imaging unit 33 of each electronic apparatus 3 may be shared by the electronic apparatuses 3, and various information may be transmitted to the information processing apparatus 5 with reference to the above factors. The factors to be used may differ among the electronic apparatuses 3.

Figure 22:
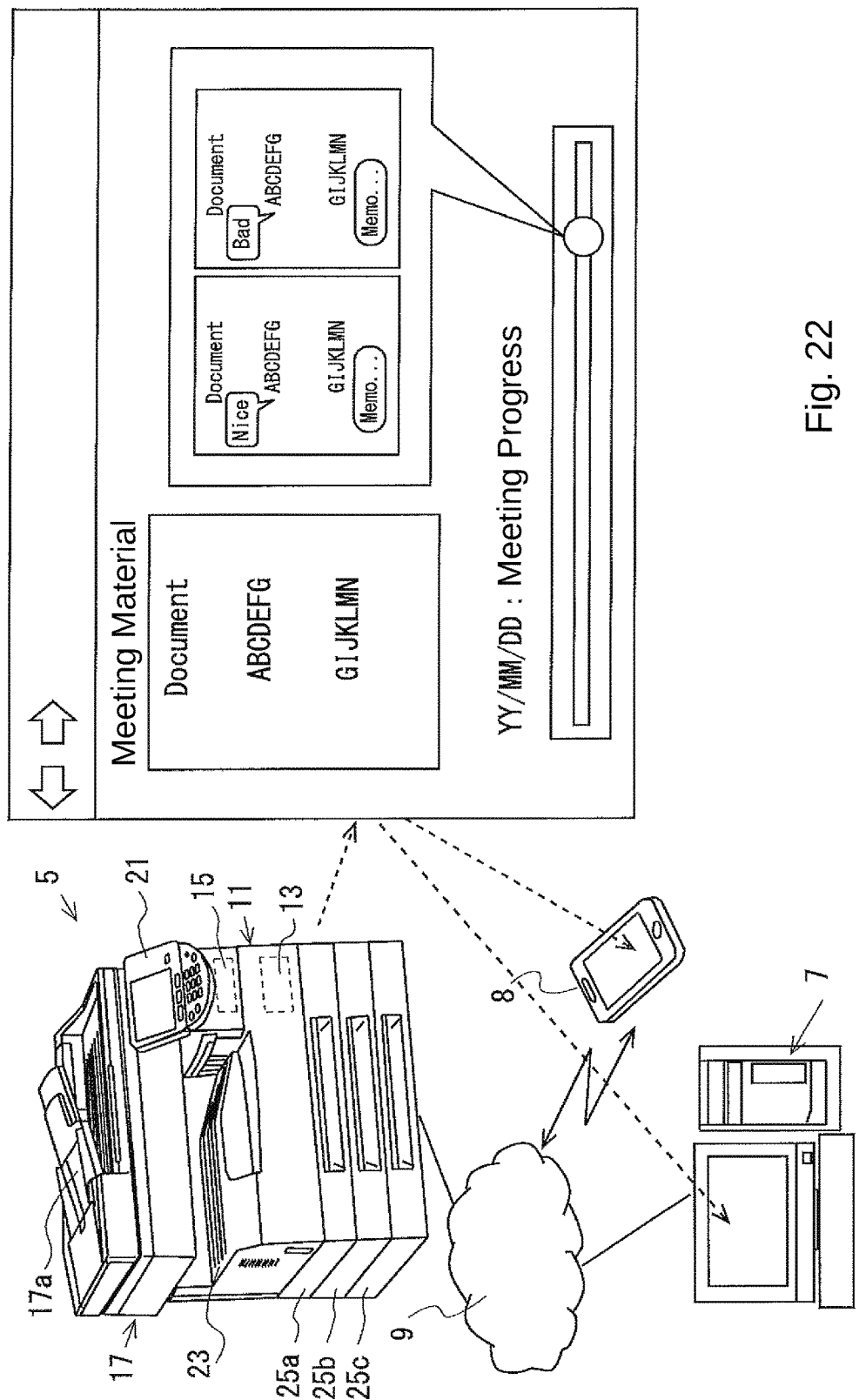
FIG. 22 is a schematic diagram for showing an example of a GUI in which the master information, difference information and sound information are associated with each other in accordance with the embodiment of the present invention.

Next, interface images will be explained with reference to FIGS. 22 and 23. FIG. 22 is a schematic diagram for showing an example of a GUI in which the master information, difference information and sound information are associated with each other in accordance with the embodiment of the present invention. As illustrated in FIG. 22, one meeting material corresponds to one master information. In this display, meeting results are arranged side by side in correspondence with one master information. The image of difference information displayed as a meeting result can be operated to retrieve sound information associated with this difference information and reproduce sounds based on the sound information. Incidentally, this interface image is transmitted through the network 9 and displayed on a smartphone 8, a terminal 7 or the like, and sounds are appropriately output.

FIG. 23 is a schematic diagram for showing an example of a GUI in which the master information, difference information, sound information and further information to be added besides the difference information are associated with each other in accordance with the embodiment of the present invention. In FIG. 23, a graph is displayed as further information added to the difference information of the example shown in FIG. 22. This graph is the third additional information to be selected as selected image information. These interface images are preferably used, for example, for providing the third additional information and the like to another site during a video conference. As illustrated in FIG. 23, by operating an image of the difference information or the graph displayed on the meeting result, relevant sound information is read out followed by reproducing sounds based on the sound information. Incidentally, in the same manner as described above, the interface image is transmitted through the network 9 and displayed on a smartphone 8, a terminal 7 or the like, and sounds are appropriately output.

Figure 24:
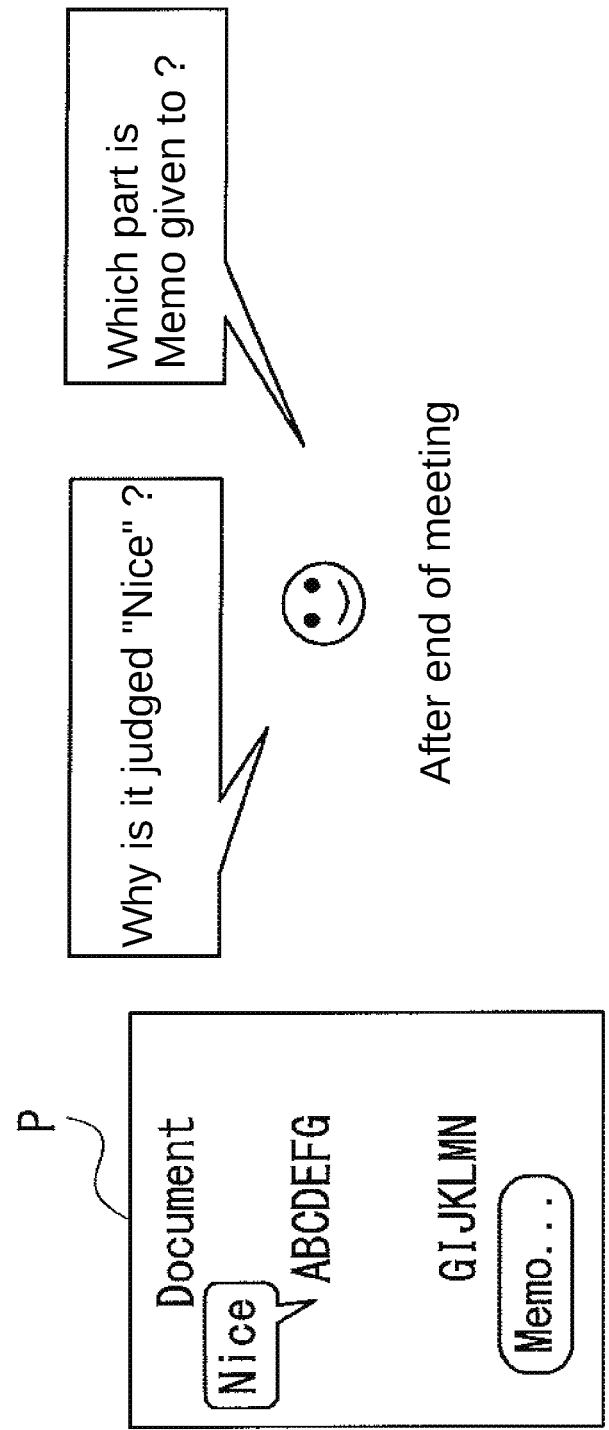
FIG. 24 is a view for schematically explaining the value of difference information after a meeting is finished in accordance with the prior art technique.

Next is an explanation of the working effects of the present embodiment in comparison with a prior art example. FIG. 24 is a view for schematically explaining the value of the difference information after a meeting is finished in accordance with the prior art technique. As shown in FIG. 24, in many cases, it cannot be remembered why the additional matters are added after the meeting is finished.

In the electronic apparatus 3 of the present embodiment, thereby, first additional information added to a material is associated with sound information acquired at the timing when the first additional information is added to the material. When there is second additional information which is used in addition to the distributed material, such second additional information is imaged by the electronic apparatus 3.

On the other hand, the information processing apparatus 5 acquires second additional information in association with the positional information and azimuth information of the imaging unit 33 mounted on the electronic apparatus 3. Third additional information to be associated is selected from among the acquired second additional information and associated with the first additional information and sound information. The third additional information is associated with the first additional information and the sound information based on the imaging time when the second additional information is imaged.

The third additional information and the sound information are thereby associated with the imaging time when the second additional information is imaged. Accordingly, it is possible to confirm the meaning of information which is used in addition to the meeting material.

Also, in accordance with the present embodiment, the information processing apparatus 5 requests the second additional information from each of the plurality of electronic apparatuses 3 based on whether or not the threshold value is equal to or exceeded by the rate at which virtual sight lines connecting a virtual imaging object with the imaging unit 33 along a virtual imaging direction generated with reference to the positional information and azimuth information concentrate on the setting area.

Accordingly, the second additional information is requested based on the rate at which virtual sight lines concentrate on the setting area. Accordingly, of information items taken by the imaging unit 33, it is possible to request an item which is considered as information which is used in addition to the distributed material.

Also, in accordance with the present embodiment, when a predetermined time elapses after there occurs a decrease below the threshold value in the rate at which virtual sight lines connecting a virtual imaging object with the imaging unit 33 along a virtual imaging direction generated with reference to the positional information and azimuth information concentrate on the setting area, the main body side communication control unit 158 requests the second additional information from each of the plurality of electronic apparatuses 3.

Accordingly, even in the case where a plurality of the electronic apparatuses 3 are not always directed to an imaging object, second additional information can be requested if a plurality of the electronic apparatuses 3 have been directed to the imaging object. Namely, even in the case where a plurality of the electronic apparatuses 3 are not always directed to an imaging object, second additional information can be requested.

Also, in accordance with the present embodiment, before a predetermined time elapses after there occurs a decrease below the threshold value in the rate at which virtual sight lines connecting a virtual imaging object with the imaging unit 33 along a virtual imaging direction generated with reference to the positional information and azimuth information concentrate on the setting area, if the rate starts increasing again up to or higher than the threshold value, the predetermined time is reset.

Accordingly, it is possible to handle the situation that a sight line leaves an imaging object, and then is directed again to the imaging object. It is therefore possible to handle the situation that sight lines are not always directed to an imaging object.

Also, in accordance with the present embodiment, when a meeting is finished while the threshold value exceeds the rate at which virtual sight lines connecting a virtual imaging object with the imaging unit 33 along a virtual imaging direction generated with reference to the positional information and azimuth information concentrate on the setting area, the electronic apparatus 3 transmits second additional information to the information processing apparatus 5.

Accordingly, after a meeting is finished, the second additional information is transmitted to the information processing apparatus 5 after the imaging unit 33 images an imaging object. The information processing apparatus 5 can thereby acquire the second additional information without a request.

Also, in accordance with the present embodiment, the display unit 21*a* displays selected image information including third additional information which is selected from among second additional information based on the order of priorities. Sound information is output by the sound output unit 28 based on an imaging time.

Accordingly, of the second additional information, effective third additional information is presented together with sound information. It is therefore possible to confirm the meaning of the third additional information through the sound information.

Also, in accordance with the present embodiment, the order of priorities is determined based on the sight line, the distortion of the imaging object imaged by the imaging unit 33 contained in the second additional information, the distance between the imaging unit 33 and the virtual imaging object or presence of an obstacle between the imaging unit 33 and the virtual imaging object.

Third additional information which is appropriate to be displayed is thereby selected from among the second additional information. It is therefore possible to select an appropriate imaging result from among imaging results taken by the imaging unit 33.

Also, in accordance with the present embodiment, as the angle that the virtual sight line makes with a virtual imaging object approaches a right angle, the priority of an imaging result is raised as a selected image information candidate. Accordingly, as the distance between the imaging unit 33 and a virtual imaging object approaches a shortest distance, the priority of the imaging result is raised as a selected image information candidate. It is therefore possible to select a selected image information candidate having little distortion.

Furthermore, in accordance with the present embodiment, when it is determined that the similarity degree of image information taken by the imaging unit 33 exceeds a predetermined value, the taken image information is transmitted to the information processing apparatus 5 as second additional information. Presence of an imaging object as second additional information is therefore determined based on the taken image information. Accordingly, it is possible to determine whether or not there is second additional information without using the positional information and the azimuth information.

Furthermore, in accordance with the present embodiment, taken image information is discarded if the taken image information corresponds to a person's face or the material generated from the master information. Accordingly, when the taken image information does not correspond to second additional information, the taken image information can be discarded. It is therefore possible to effectively utilize a storage area and a communication band.

Furthermore, in accordance with the present embodiment, if it is determined based on inhibition conditions that the second additional information or the sound information cannot be acquired, the request for the second additional information from the main body side communication control unit 158 is ignored. Accordingly, the system can be configured not to transmit the second additional information based on the inhibition conditions even if there is a request for the second additional information. It is therefore possible to select information, which can be transmitted, by appropriately determining the inhibition conditions.

Furthermore, in accordance with the present embodiment, in the case where the rate is calculated by the arithmetic unit 378 of each the electronic apparatus 3, the terminal side communication control unit 377 transmits the second additional information to the information processing apparatus 5 based on whether or not the rate is greater than or equal to the threshold value.

Accordingly, even if the second additional information is not requested by the information processing apparatus 5, the second additional information can be transmitted to the information processing apparatus 5 based on the threshold value and the rate calculated by the arithmetic unit 378 of each the electronic apparatus 3. It is therefore possible to perform the process with the rates which differ among the electronic apparatuses 3.

Furthermore, in accordance with the present embodiment, the threshold value can be adjusted by the plurality of electronic apparatuses 3 or the information processing apparatus 5. Namely, different threshold values can be set among the electronic apparatuses 3 or between the electronic apparatuses 3 and the information processing apparatus 5. Accordingly, the process can be performed not only based on the same rate but also based on different rates.

Furthermore, in accordance with the present embodiment, the interface image is controlled to associate the master information stored in the main body side storage unit 27, the sound information, the first additional information and the selected image information with each other. Namely, the interface image serves as an interface displayed for associating the master information, the sound information, the first additional information and the selected image information with each other. It is therefore possible to output any one from any other of the master information, the sound information, the first additional information and the selected image information associated with each other.

Furthermore, in accordance with the present embodiment, when each of the plurality of electronic apparatuses 3 transmits the second additional information to the information processing apparatus 5 on a real time base, a real time image displaying the second additional information is updated besides the interface image each time the second additional information is transmitted. Namely, the real time image includes latest second additional information. It is therefore possible to provide the real time image to terminals and the like accessing the information processing apparatus 5.

Furthermore, in accordance with the present embodiment, at the timing when detecting the differences which are extracted between the meeting content contained in the taken image information and the master information saved in the information processing apparatus 5, the difference information of the differences is associated with the sound information. Accordingly, the difference information and the sound information are associated with each other in the meeting content contained in the same master information. The meanings of the difference information in the meeting content can thereby be confirmed based on the sound information.

The information processing system 1 have been explained based on the embodiment in accordance with the present invention. However, it is not intended to limit the present invention to the precise form described, and obviously many modifications and variations are possible without departing from the spirit and scope of the invention.

For example, in the case of the present embodiment, the image control unit 154 is explained as a functional unit which is implemented in the control unit 15. The present invention is not limited thereto. For example, the image control unit 154 can be provided as a separate unit independently from the control unit 15.

Also, while the electronic apparatus 3 is attached to the eyeglasses 10 in the above example, the present invention is not limited thereto, but the eyeglasses 10 and the electronic apparatus 3 can be integrated as one unit. Furthermore, the present invention can be applied to contact lens incorporating the functions of the electronic apparatus 3.

While the electronic apparatus 3 and the information processing apparatus 5 exchange data as the information processing system 1 in the above example, the present invention is not limited thereto, but the information processing system 1 may be implemented with the information processing apparatus 5 and the smartphone 8 which is provided with the functionality of the electronic apparatus 3 and exchanges data with the information processing apparatus 5. In this case, an application for implementing the functionality of the electronic apparatus 3 is installed in the smartphone 8.

Also, while the identification image X contains a two-dimensional code in the above example, the present invention is not limited thereto, but a one-dimensional code such as the barcode or a three-dimensional code such as the PM code (registered trademark) can be used instead. Furthermore, the two-dimensional code of the identification image X is the QR code (registered trademark) in the above example, the present invention is not limited thereto, but the CP code (registered trademark) or the like can be used instead. Namely, the code is not particularly limited as long as the attribute information of the master information can be acquired from the identification image information by reading the identification image X with the imaging unit 33.

Furthermore, while in the above example the information processing apparatus 5 requests the electronic apparatus 3 to transmit the second additional information when it is determined that a meeting is finished, the present invention is not limited to this case. For example, when it is determined that a meeting is finished, the electronic apparatus 3 can transmit the second additional information to the information processing apparatus 5 irrespective of whether or not the information processing apparatus 5 requests transmission of the second additional information.

Furthermore, while in the above example the process in steps S71 to S75 has been explained as part of the request process, the present invention is not limited to this case. For example, in this case, steps S92 to S95 can be performed in place of steps S71 to S75.

Although embodiments of the present invention have been described and illustrated in detail, it is clearly understood that the same is by way of illustration and example only and not limitation, the scope of the present invention should be interpreted by terms of the appended claims.

What is claimed is:

1. An information processing system comprising a plurality of electronic apparatuses and an information processing apparatus which transmits and receives various information to and from the plurality of electronic apparatuses,
wherein each of the plurality of electronic apparatuses comprises:
an imaging device; and
a first processor comprising hardware, the first processor being configured to perform processes comprising:
a terminal side association process which associates first additional information added to a material used during a meeting with sound information acquired at a timing when the first additional information is added to the material;
an imaging process which takes an image, imaged by the imaging device, of second additional information which is used during the meeting in addition to the material, the second additional information being different from both the first additional information and the material to which the first additional information is added; and
a position determination process which obtains positional information and azimuth information of the imaging device,
wherein the information processing apparatus comprises a second processor comprising hardware, the second processor being configured to perform processes comprising:
an acquisition process which acquires second additional information imaged by the imaging device from each of the plurality of electronic apparatuses when it is determined, based on the positional information and azimuth information of the imaging device detected in the position determination process, that a predetermined condition has been satisfied;

a selection process which selects third additional information to be associated from among the second additional information acquired in the acquisition process; and a main body side association process which associates the third additional information selected in the selection process with the first additional information and the sound information which are associated with each other in the terminal side association process, and wherein the main body side association process associates the third additional information with the first additional information and the sound information based on an imaging time when the second additional information selected as the third additional information is imaged.

2. The information processing system of claim 1, wherein the second processor is further configured to perform a main body side communication control process which controls transmission and reception of the various information, and wherein the main body side communication control process requests the second additional information from each of the plurality of electronic apparatuses in accordance with whether or not a threshold value is equal to or exceeded by a rate at which virtual sight lines connecting a virtual imaging object with the imaging device along a virtual imaging direction generated with reference to the positional information and azimuth information concentrate on a predetermined setting area.

3. The information processing system of claim 2, wherein when a predetermined time elapses after the rate decreases below the threshold value, the main body side communication control process requests the second additional information from each of the plurality of electronic apparatuses.

4. The information processing system of claim 3, wherein when the rate increases up to or higher than the threshold value before the predetermined time elapses, the predetermined time is reset.

5. The information processing system of claim 4, wherein the first processor is further configured to perform a terminal side communication control process which controls transmission and reception of the various information, and wherein when the meeting has been finished while the rate is lower than the threshold value, the terminal side communication control process transmits the second additional information to the information processing apparatus.

6. The information processing system of claim 5, wherein the second processor is further configured to perform processes comprising:

an image control process which generates selected image information containing the third additional information selected in the selection process;

a display control process which controls to display the selected image information generated in the image control process; and a sound output control process which controls to output sounds based on the imaging time and the sound information, and wherein the selection process selects the third additional information, which is effective, from among the second additional information, based on an order of priorities.

7. The information processing system of claim 6, wherein the second processor is further configured to perform a determination process which determines the order of priorities based on the sight line, a distortion of an imaging object imaged by the imaging device contained in the second additional information, a distance between the imaging device and the virtual imaging object, or presence of an obstacle between the imaging device and the virtual imaging object.

8. The information processing system of claim 7, wherein as an angle that the virtual sight line makes with the virtual imaging object approaches a right angle, the determination process raises the priority as a selected image information candidate.

9. The information processing system of claim 8, wherein the first processor is further configured to perform an image determination process which determines whether or not a predetermined value is exceeded by a similarity degree of taken image information taken by the imaging device, and wherein if the image determination process determines that the predetermined value is exceeded by the similarity degree of the taken image information, the terminal side communication control process transmits the taken image information to the information processing apparatus as the second additional information.

10. The information processing system of claim 9, wherein the information processing apparatus further comprises a main body side storage device which stores master information corresponding to the material, and wherein if it is determined that the taken image information corresponds to a person's face or the material generated from the master information stored in the main body side storage device, the terminal side communication control process discards the taken image information.

11. The information processing system of claim 10, wherein the first processor is further configured to perform an inhibition determination process which determines, based on inhibition conditions, whether or not the second additional information or the sound information cannot be acquired, and wherein if the inhibition determination process determines that the second additional information or the sound information cannot be acquired, the terminal side communication control process neglects the request for the second additional information made in the main body side communication control process.

12. The information processing system of claim 11, wherein each of the plurality of electronic apparatuses further comprises a terminal side storage device which stores the threshold value, wherein the first processor is further configured to perform an arithmetic process which calculates the rate, and wherein if the arithmetic process calculates the rate before the main body side communication control process requests the second additional information, the terminal side communication control process transmits the second additional information to the information processing apparatus in accordance with whether or not the rate is greater than or equal to the threshold value.

13. The information processing system of claim 12, wherein the threshold value is adjustable by the plurality of electronic apparatuses or the information processing apparatus.

14. The information processing system of claim 13, wherein the image control process controls output of an interface image which associates the master information stored in the main body side storage device, the sound information, the first additional information, and the selected image information with each other.

15. The information processing system of claim 14, wherein in a case where each of the plurality of electronic apparatuses transmits the second additional information to the information processing apparatus on a real time basis, a real time image displaying the second additional information is updated besides the interface image each time the second additional information is transmitted in the terminal side communication control process.

16. The information processing system of claim 14, wherein the first processor is further configured to perform an extracting process which extracts, at each detection cycle and based on medium information of a paper medium imaged by the imaging device, a difference between meeting content contained in the medium information and the meeting content contained in the master information saved in the information processing apparatus, and
wherein at a timing of detecting the difference which is extracted in the extracting process, the terminal side association process associates difference information of the difference with the sound information.

17. An information processing apparatus which transmits and receives various information to and from a plurality of electronic apparatuses, the information processing apparatus comprising:
a hardware processor configured to perform processes comprising:
a first acquisition process which acquires, from each of the plurality of electronic apparatuses, first additional information added to a material used during a meeting with sound information acquired at a timing when the first additional information is added to the material, the first additional information and the sound information being associated with each other;
a second acquisition process which acquires second additional information imaged by an imaging device of each of the plurality of electronic apparatuses, from each of the plurality of electronic apparatuses, the second additional information being used during the meeting in addition to the material, the second additional information being different from both the first additional information and the material to which the first additional information is added, and the second acquisition process acquiring the second additional information when it is determined, based on detected positional information and azimuth information of the imaging device of each of the plurality of electronic apparatuses, that a predetermined condition has been satisfied;
a selection process which selects third additional information to be associated from among the second additional information acquired in the second acquisition process; and
a main body side association process which associates the third additional information selected in the selection process with the first additional information and the sound information which are associated with each other,
wherein the main body side association process associates the third additional information with the first additional information and the sound information based on an imaging time when the second additional information selected as the third additional information is imaged.

18. An information processing method which is performed by an information processing system comprising a plurality of electronic apparatuses and an information processing apparatus which transmits and receives various information to and from the plurality of electronic apparatuses,
wherein at each of the plurality of electronic apparatuses, the information processing method comprises:
a terminal side association processing step of associating first additional information added to a material used during a meeting with sound information acquired at a timing when the first additional information is added to the material;
an imaging step of taking an image of second additional information which is used during the meeting in addition to the material, the second additional information being different from both the first additional information and the material to which the first additional information is added; and
a detection step of detecting positional information and azimuth information of each of the plurality of electronic apparatuses which takes an image in the imaging step,
wherein at the information processing apparatus, the information processing method comprises:
an acquisition step of acquiring the second additional information imaged in the imaging step from each of the plurality of electronic apparatuses when it is determined, based on the positional information and azimuth information detected in the detection step during imaging in the imaging step, that a predetermined condition has been satisfied;
a selection step of selecting third additional information to be associated from among the second additional information acquired in the acquisition step; and
a main body side association processing step of associating the third additional information selected in the selection step with the first additional information and the sound information which are associated with each other in the terminal side association processing step, and
wherein the main body side association processing step is performed to associate the third additional information with the first additional information and the sound information based on an imaging time when the second additional information selected as the third additional information is imaged.

19. An information processing method which is performed by an information processing apparatus which transmits and receives various information to and from a plurality of electronic apparatuses, the information processing method comprising:
a first acquisition step of acquiring, from each of the plurality of electronic apparatuses, first additional information added to a material used during a meeting with sound information acquired at a timing when the first additional information is added to the material, the first additional information and the sound information being associated with each other;
a second acquisition step of acquiring second additional information imaged by an imaging device of each of the plurality of electronic apparatuses, from each of the plurality of electronic apparatuses, the second additional information being used during the meeting in addition to the material, the second additional information being different from both the first additional information and the material to which the first additional information is added, and the second acquisition process acquiring the second additional information when it is determined, based on the positional information and azimuth information of the imaging device of each of the plurality of electronic apparatuses, that a predetermined condition has been satisfied;

a selection step of selecting third additional information to be associated from among the second additional information acquired in the acquisition step; and a main body side association processing step of associating the third additional information selected in the selection step with the first additional information and the sound information which are associated with each other, wherein the third additional information is associated with the first additional information and the sound information in the main body side association processing step based on an imaging time when the second additional information selected as the third additional information is imaged.

20. A non-transitory computer readable medium including programmed instructions which, when executed by a computer, cause the computer to control an information processing apparatus which transmits and receives various information to and from a plurality of electronic apparatuses to perform processes comprising:

a first acquisition process which acquires, from each of the plurality of electronic apparatuses, first additional information added to a material used during a meeting with sound information acquired at a timing when the first additional information is added to the material, the first additional information and the sound information being associated with each other;

a second acquisition process which acquires second additional information imaged by an imaging device of each of the plurality of electronic apparatuses, from each of the plurality of electronic apparatuses, the second additional information being used during the meeting in addition to the material, the second additional information being different from both the first additional information and the material to which the first additional information is added, and the second acquisition process acquiring the second additional information when it is determined, based on detected positional information and azimuth information of the imaging device of each of the plurality of electronic apparatuses, that a predetermined condition has been satisfied;

a selection process which selects third additional information to be associated from among the second additional information acquired in the second acquisition process; and a main body side association process which associates the third additional information selected in the selection process with the first additional information and the sound information which are associated with each other, wherein the main body side association process associates the third additional information with the first additional information and the sound information based on an imaging time when the second additional information selected as the third additional information is imaged.

* * * * *